Dec. 29, 1936.   J. E. LOVELY ET AL   2,065,816
MACHINE TOOL
Filed Dec. 14, 1934   17 Sheets-Sheet 1
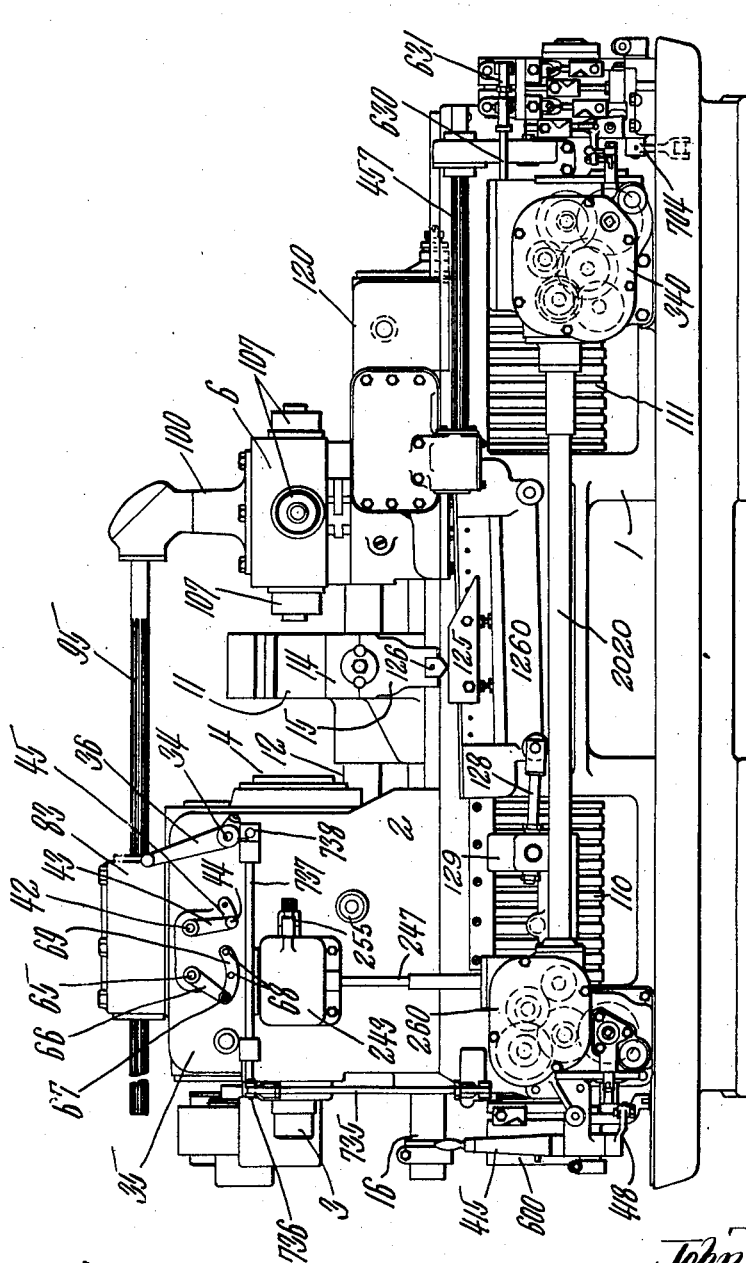

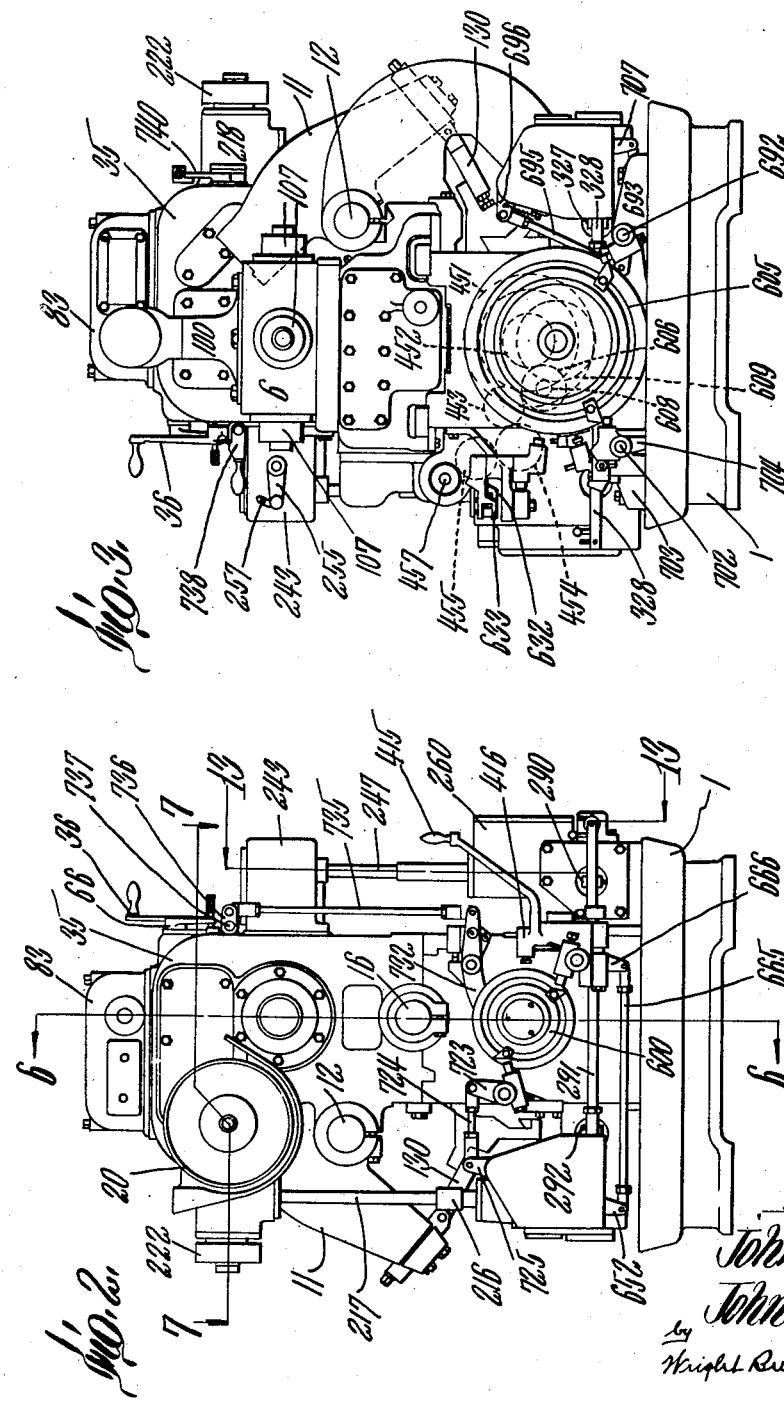

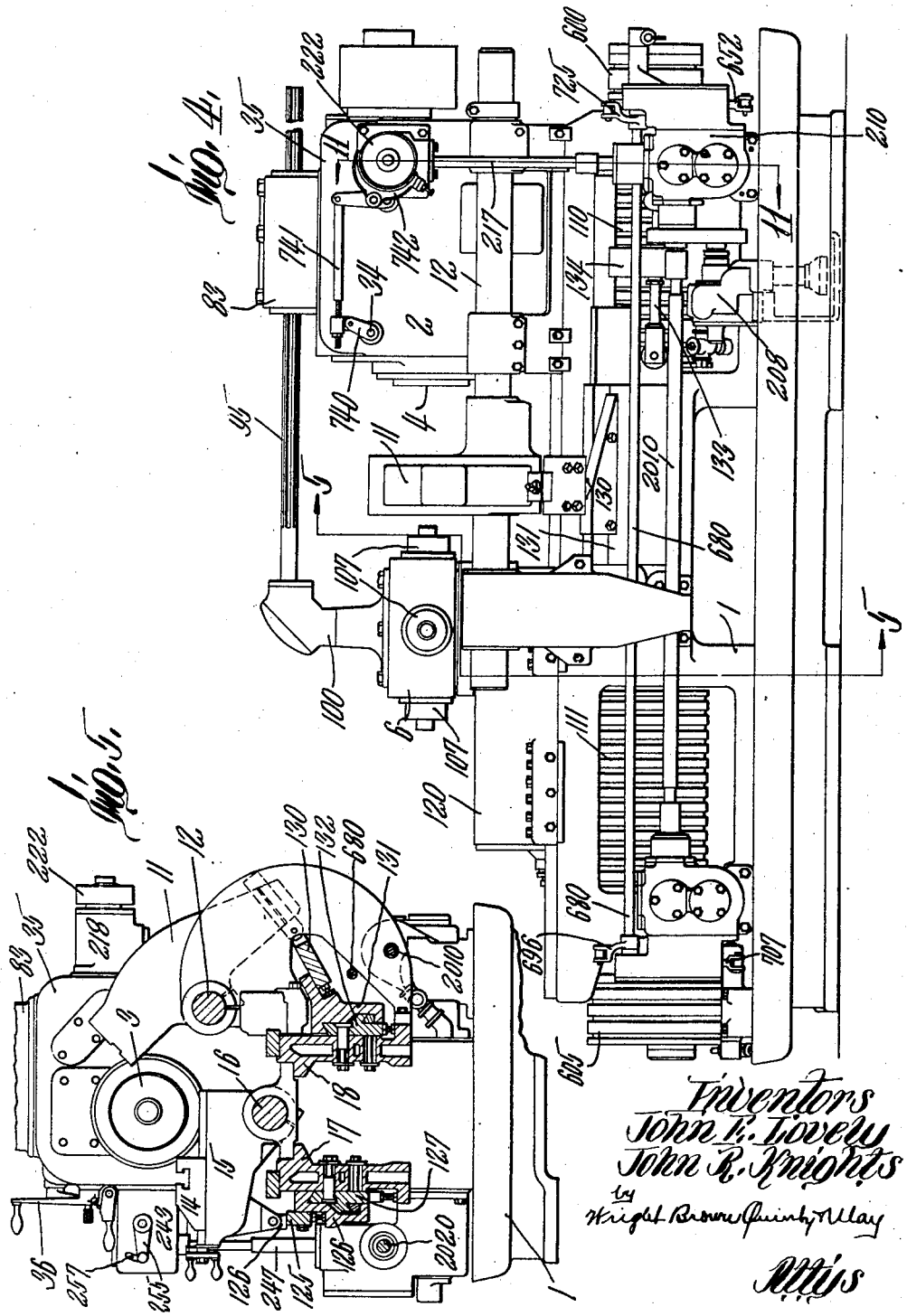

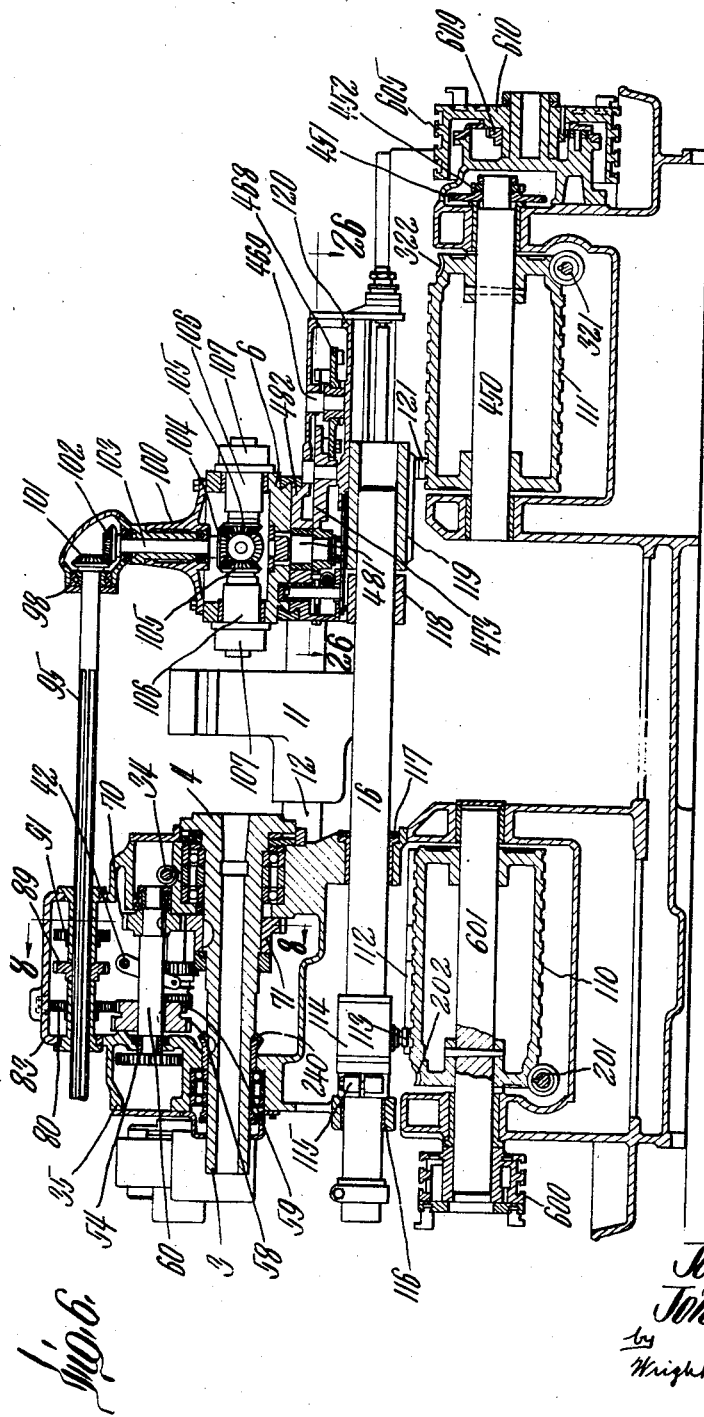

Dec. 29, 1936. J. E. LOVELY ET AL 2,065,816
MACHINE TOOL
Filed Dec. 14, 1934 17 Sheets-Sheet 5
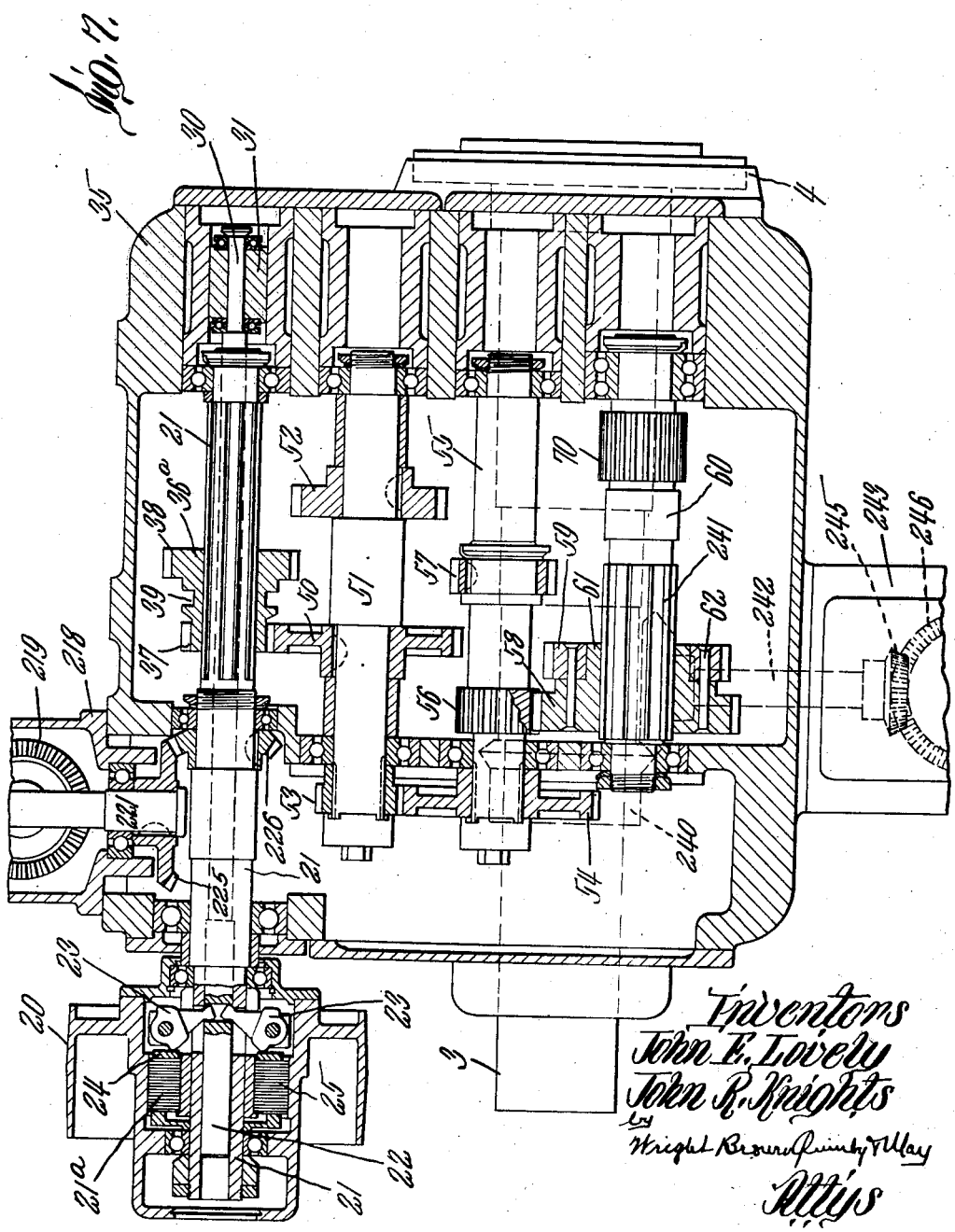

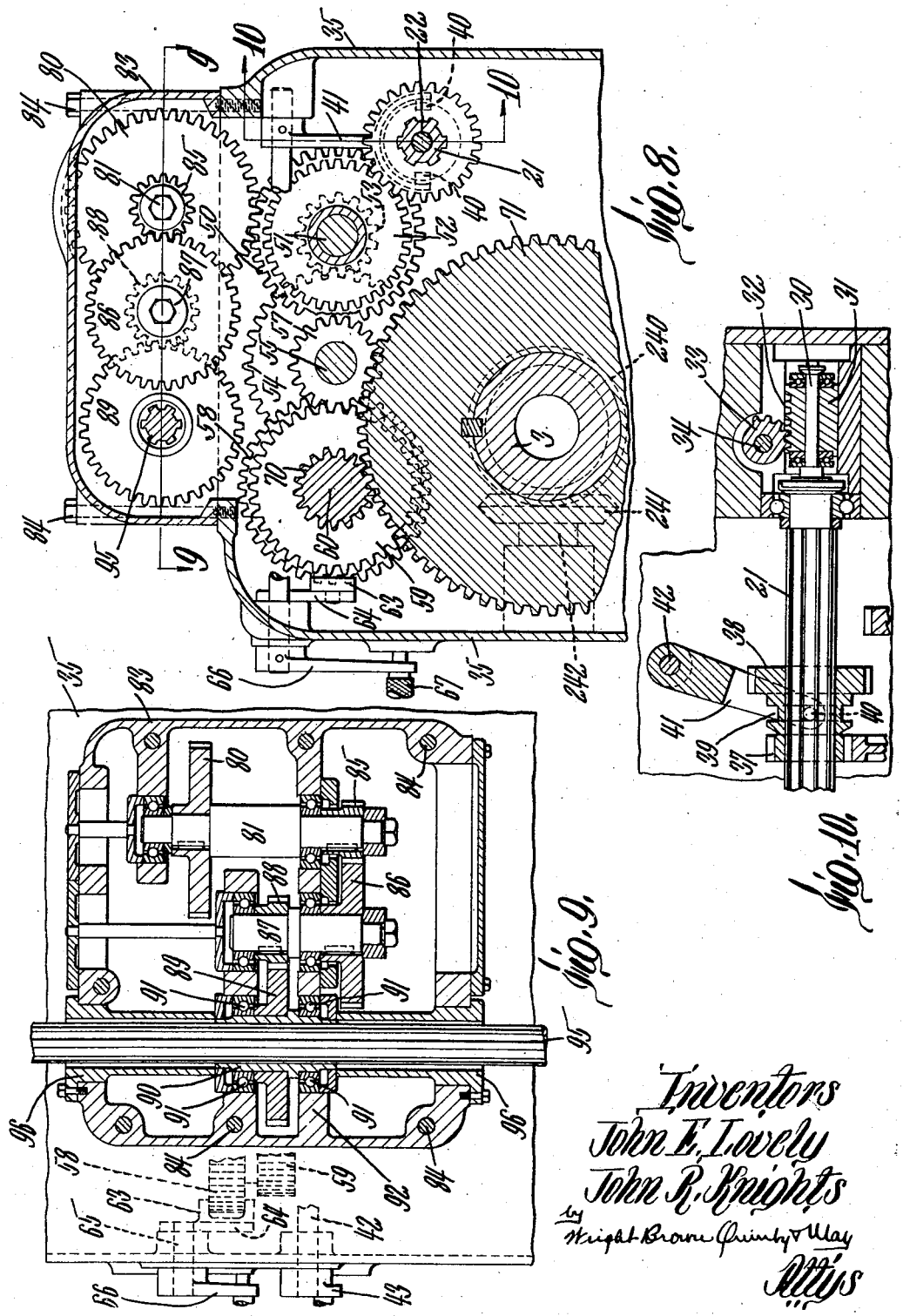

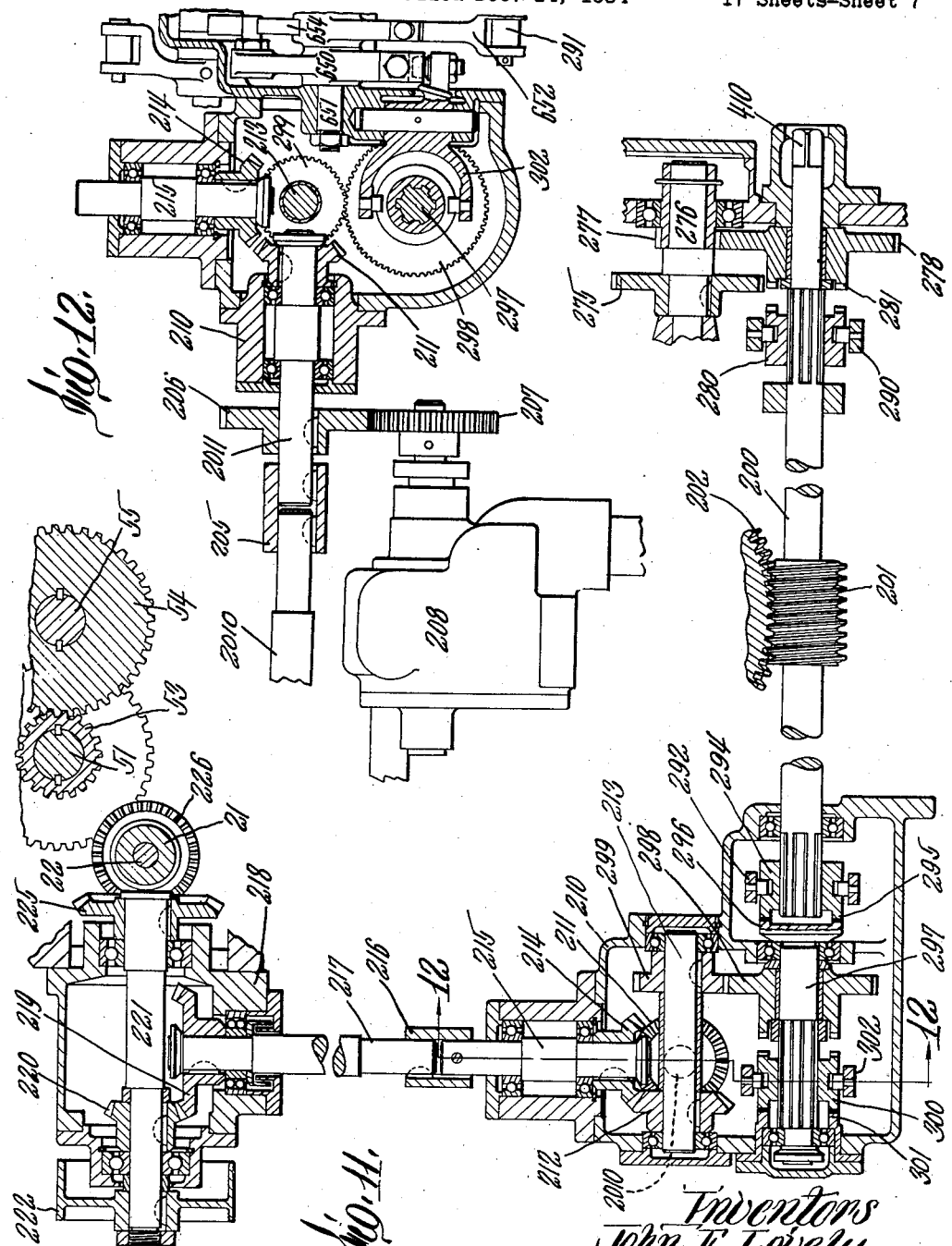

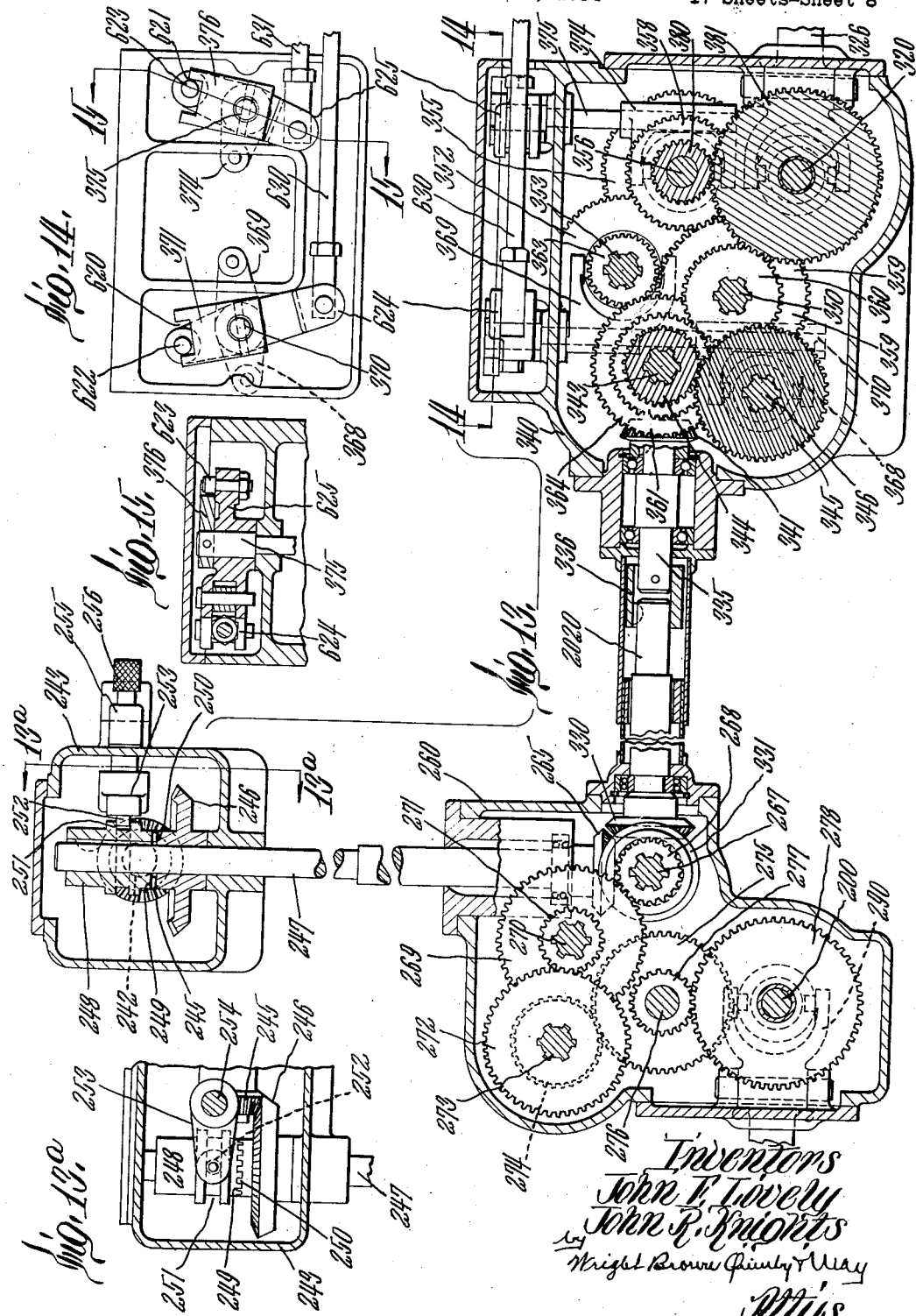

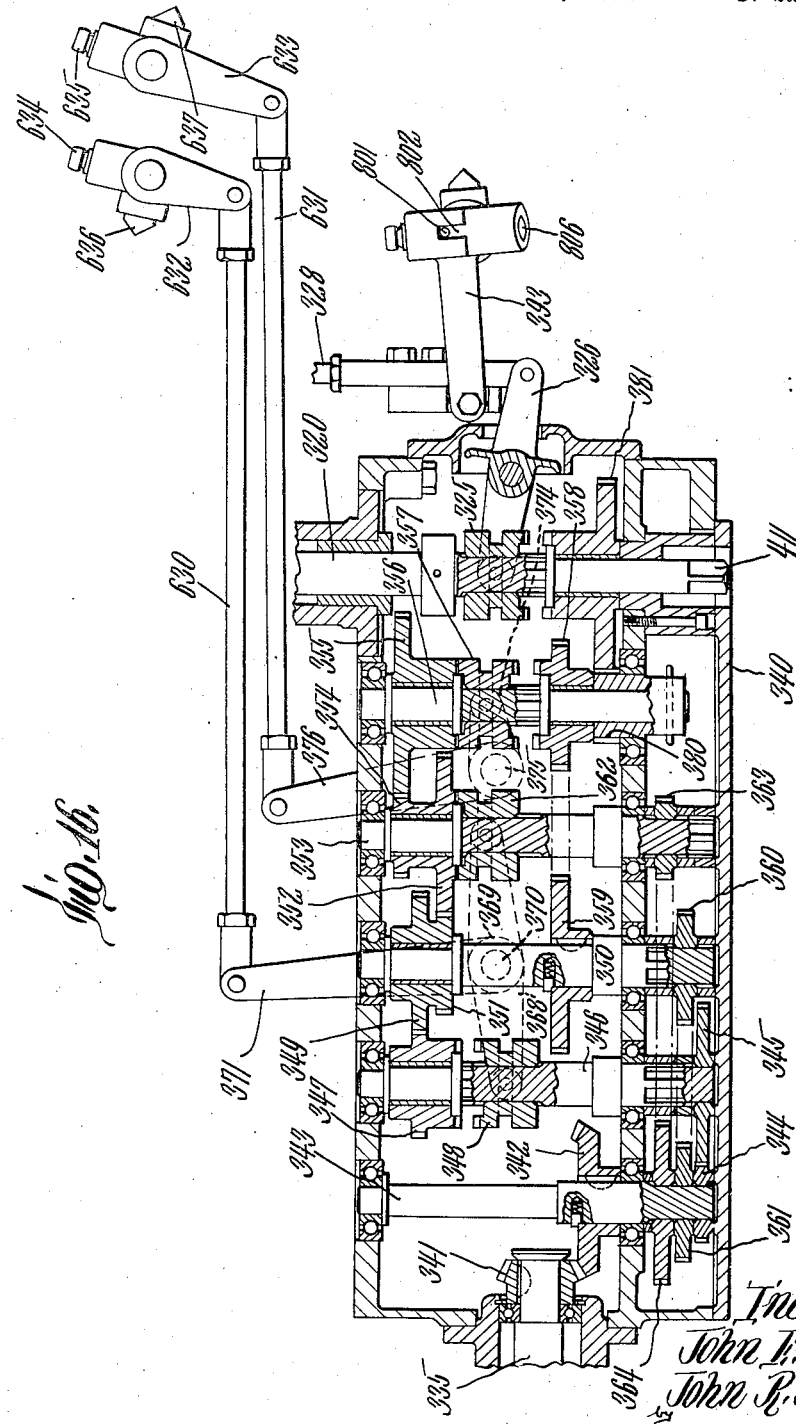

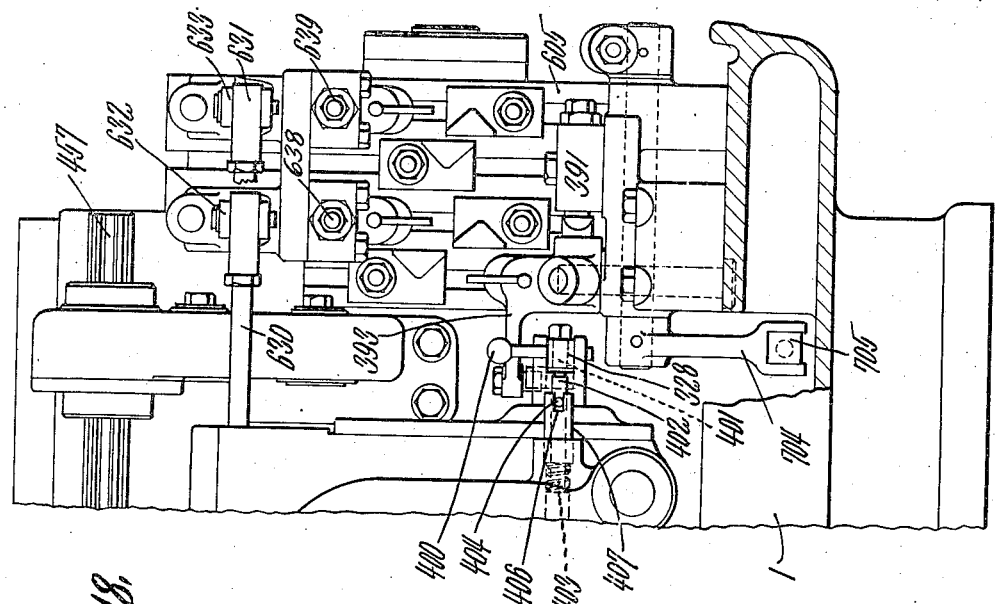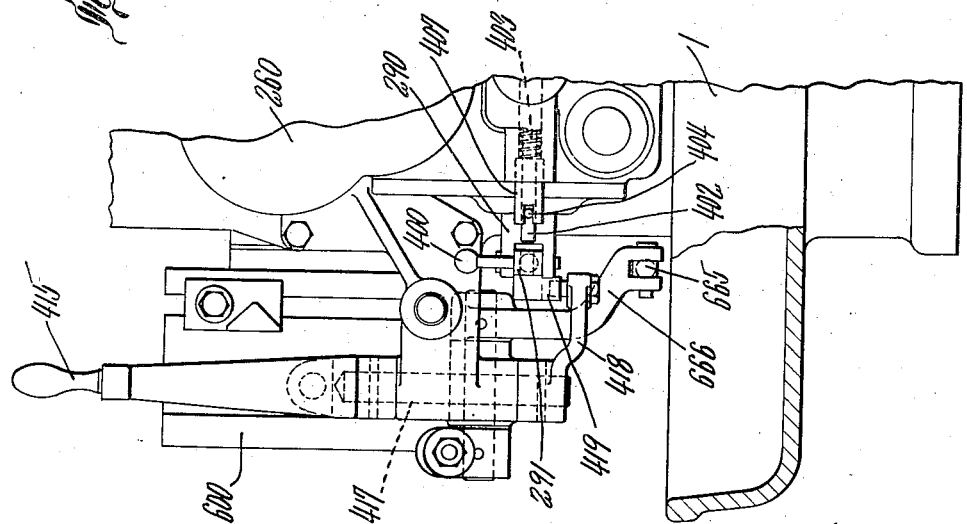

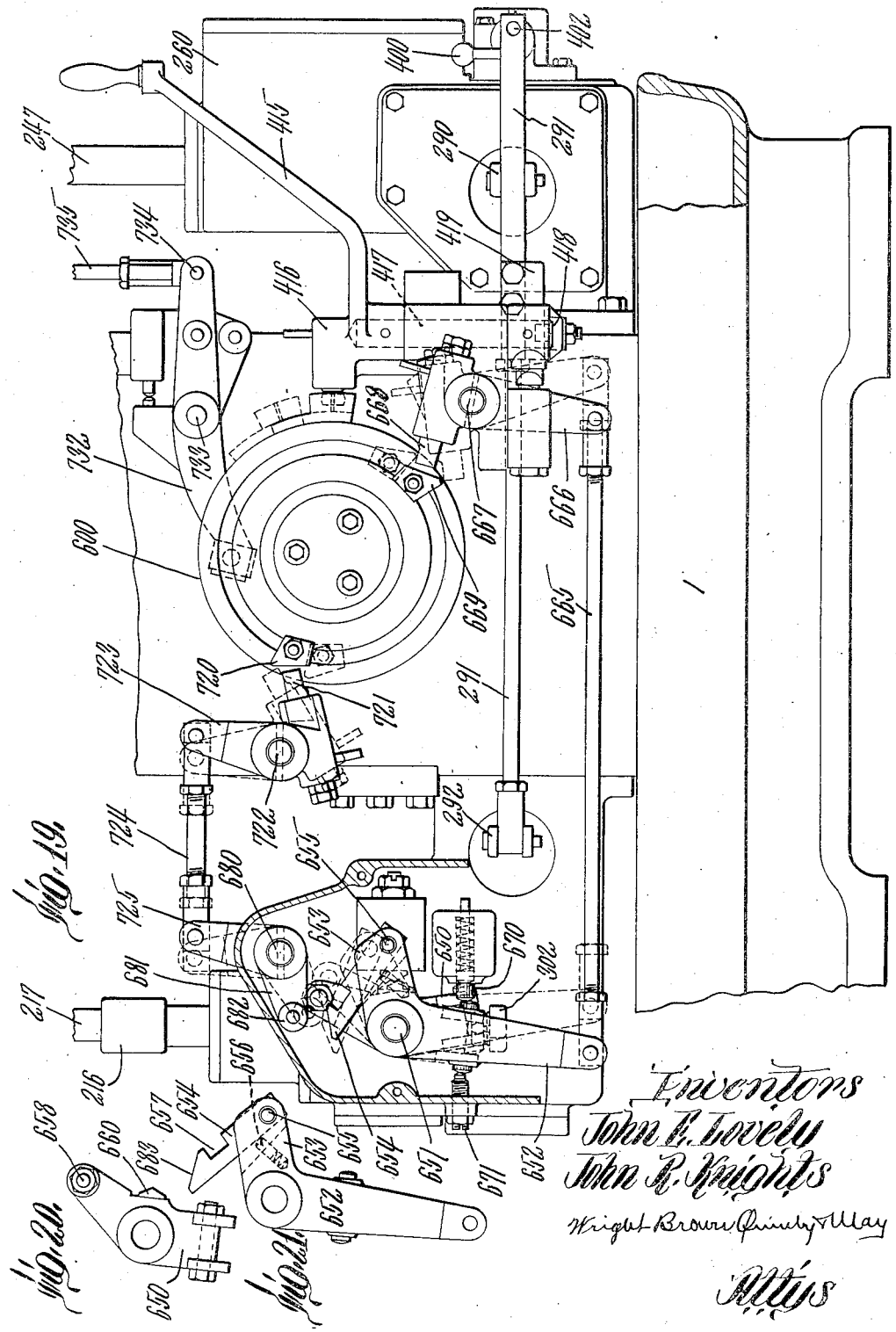

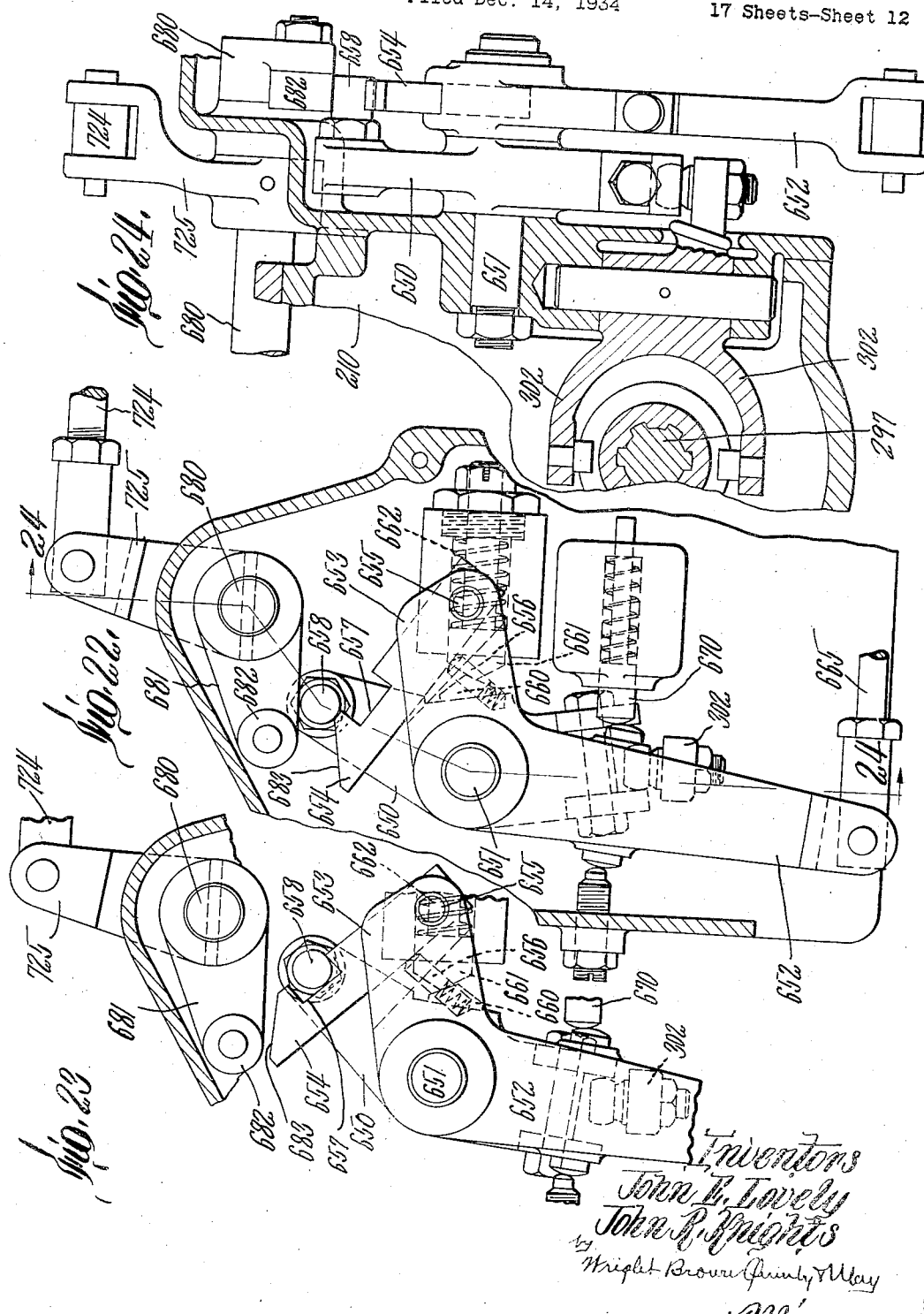

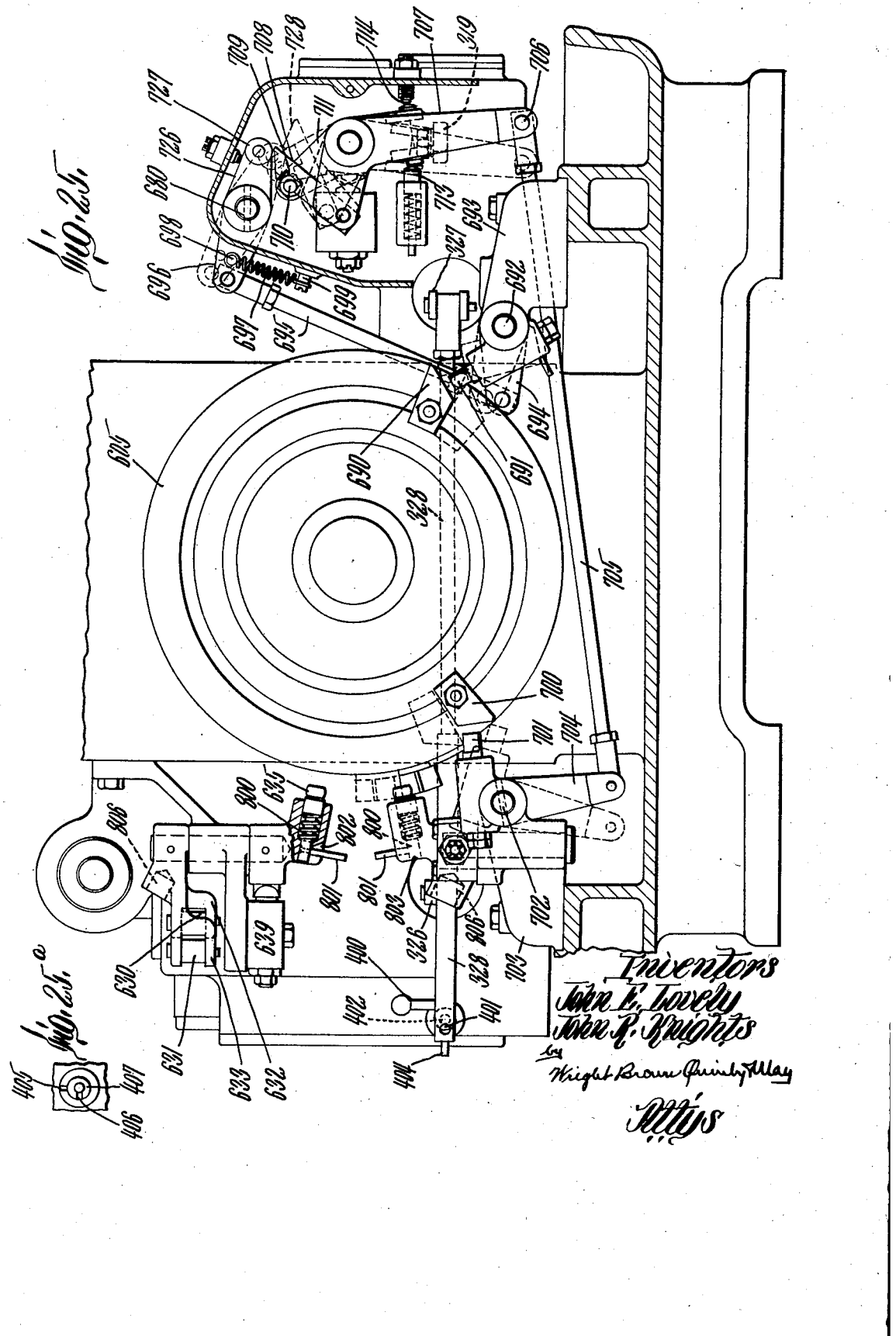

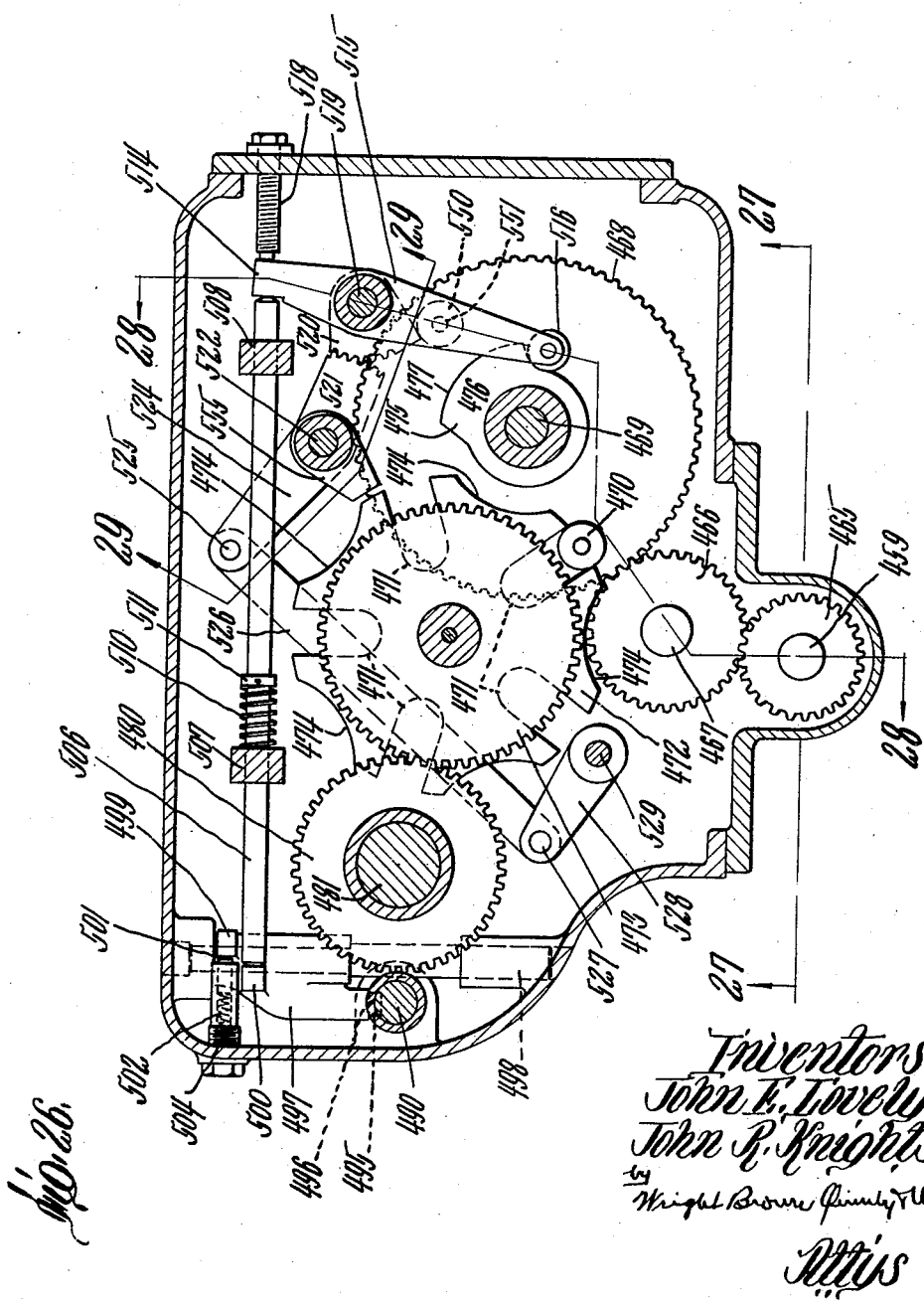

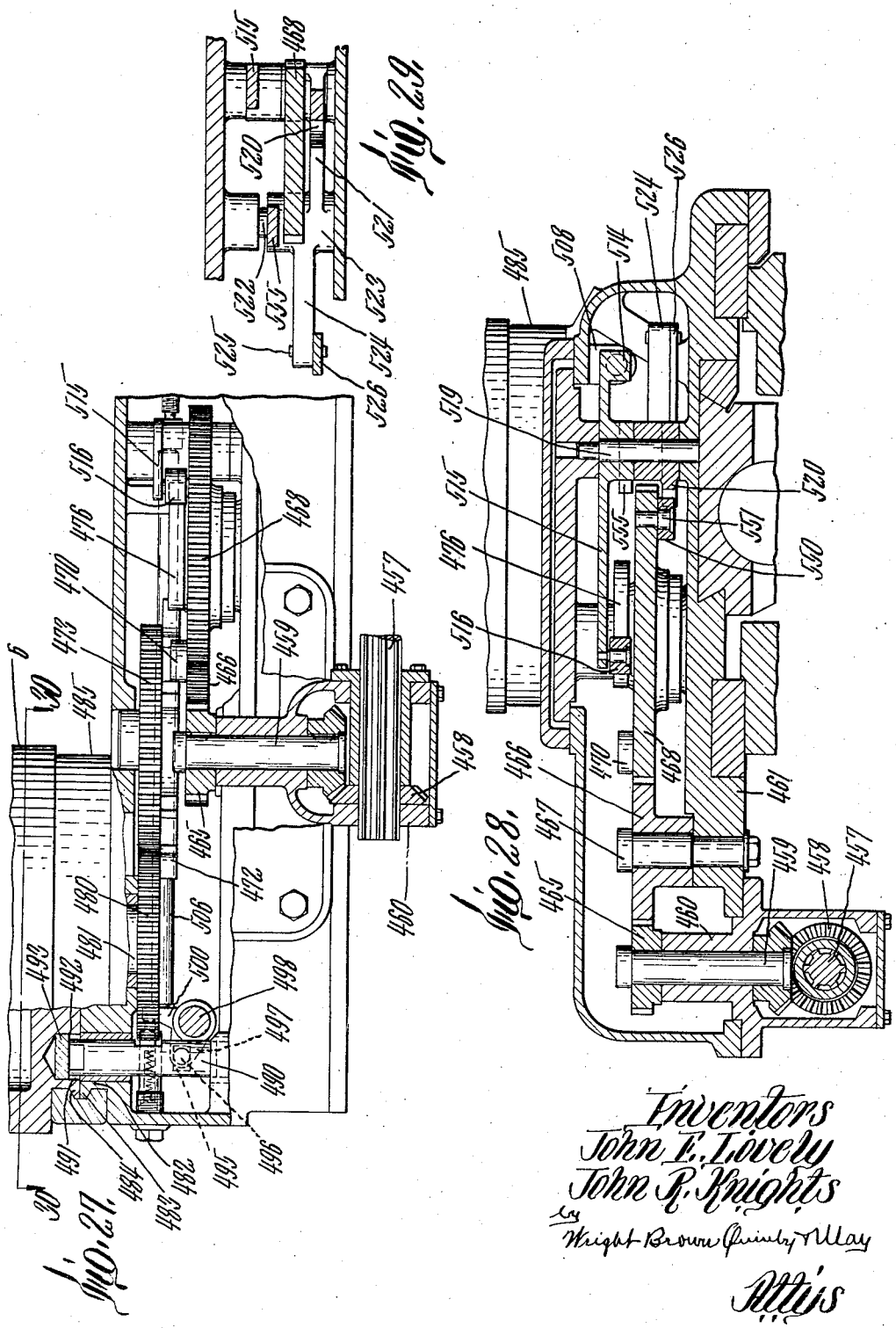

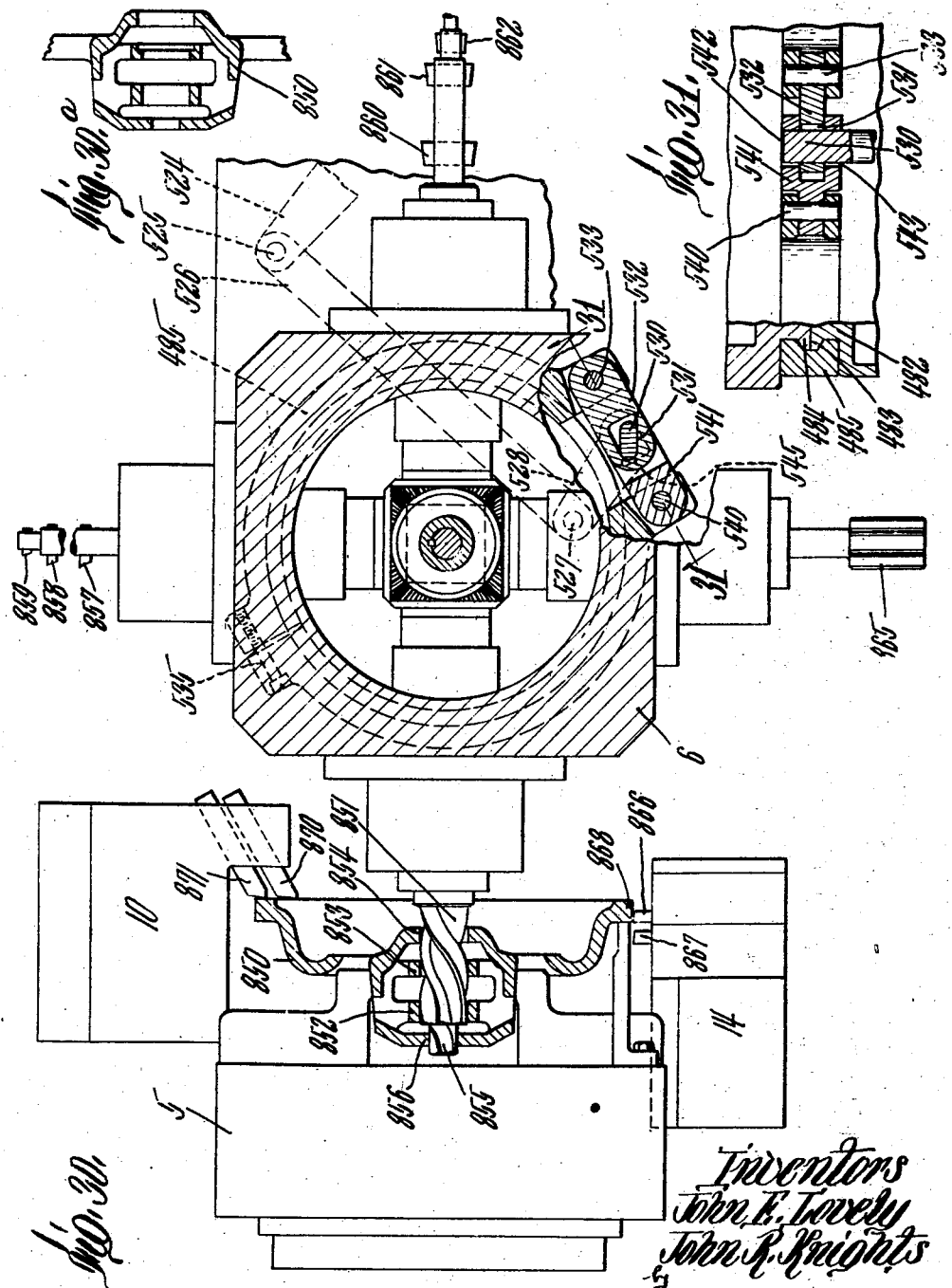

Dec. 29, 1936.  J. E. LOVELY ET AL  2,065,816
MACHINE TOOL
Filed Dec. 14, 1934   17 Sheets-Sheet 17
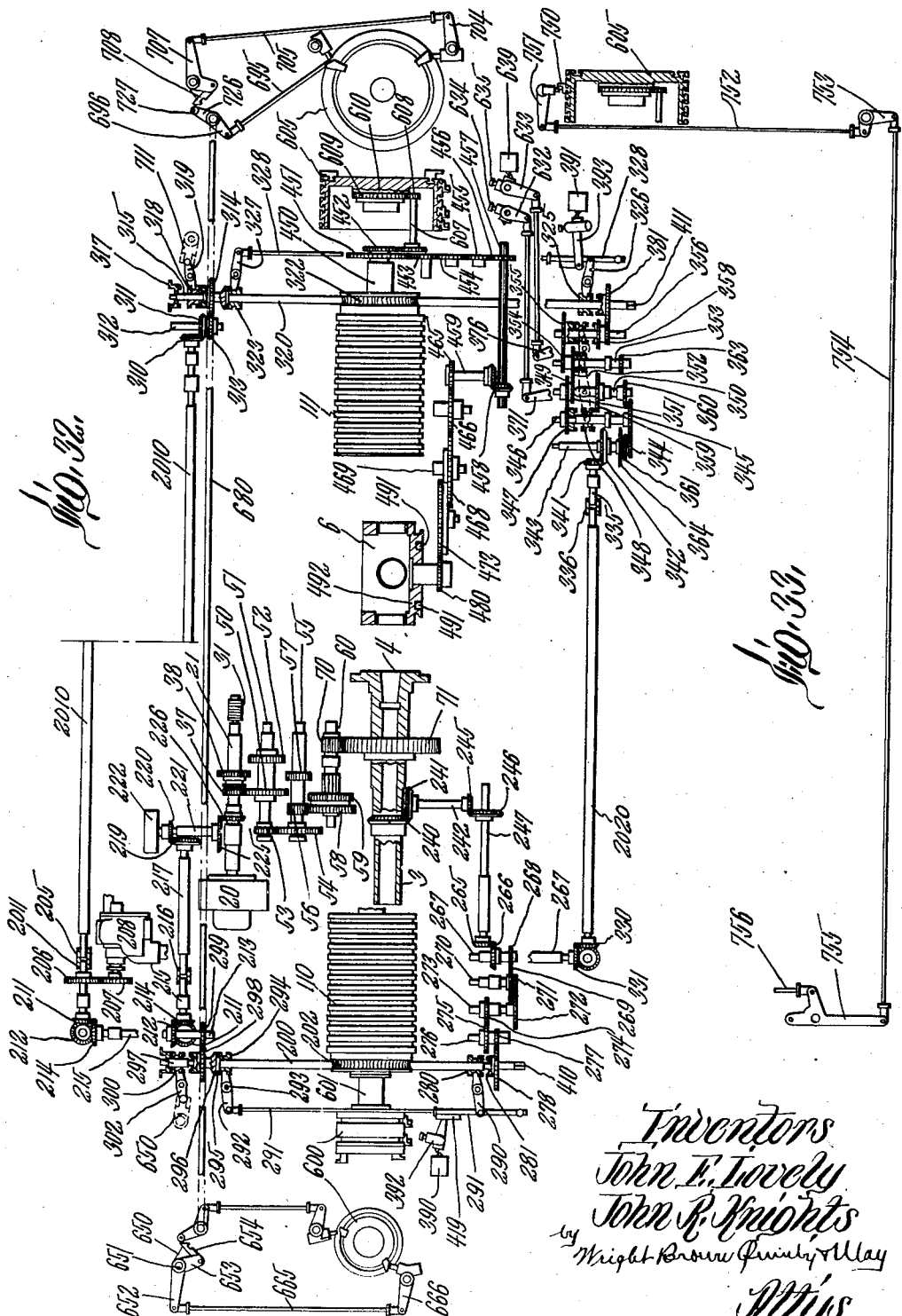

Patented Dec. 29, 1936

2,065,816

UNITED STATES PATENT OFFICE 2,065,816

MACHINE TOOL

John E. Lovely and John R. Knights, Springfield, Vt., assignors to Jones & Lamson Machine Company, Springfield, Vt., a corporation of Vermont Application December 14, 1934, Serial No. 757,537

23 Claims. (Cl. 29—44)

This invention relates to machine tools in which a plurality of tools, which may be of different types, operate on the work in various relations such as in sequence, simultaneously, or in overlapping time relation, during a complete machine cycle.

One object of this invention is to provide actuating and controlling means for such tools which shall permit each tool to operate to its own best advantage without imposing thereon undesirable conditions of operation required for best operation of other tools.

This invention, as herein illustrated, is embodied in a machine having a turret carrying certain of the tools for operating in sequence on the work, and other tools carried by one or more tool carriages which may, if desired, be caused to traverse the work as well as to move inwardly and outwardly relative to the work axis.

A further object of this invention, therefore, when embodied in such a turret machine, is to make possible control of the motions of the tool carriages and the turret independently of each other.

Still other objects are to provide for controlling the turret tool cutting motions in accordance with the requirements of the particular tool in operation at any one time and to do this in connection with the same turret-moving mechanism for all the turret tools. This may be done by controlling the rate of motion of the turret-moving mechanism independently for each indexed position of the turret.

For this and other purposes the turret is arranged to be given its operative and idle return motions by an actuating cam which may be operated selectively at different speeds or stopped altogether for pre-determined periods in conformity to the requirements of the particular tool in operative indexed position, and independently in the various indexed turret positions.

Provision may also be made for actuating and controlling the motions of the tool carriages by cam means which also may stop the rotation of the work holder, which carries the work being operated on by the various tools, at the end of a complete machine cycle.

Provision may also be made for rotation of tools carried by the turret either with or without definite relation to the speed of rotation of the work holder.

The various cam mechanisms may comprise rotary cam drums with such interconnection between them that the desired sequence of controlled operations may proceed automatically throughout the entire cycle of operations during which each tool comes into and goes out of operation at the proper time automatically.

Provision may also be made whereby the changes from one to a succeeding operation may be controlled by either of a pair of cam drums, the parts being so interconnected that at least one of these drums is rotating at all times during the complete operative cycle of the machine.

For a more complete understanding of this invention, reference may be had to the accompanying drawings in which Figure 1 is a front elevation of a machine embodying the invention.

Figures 2 and 3 are left and right hand elevations, respectively, of the same.

Figure 4 is a rear elevation of the same.

Figure 5 is a detail section on line 5—5 of Figure 4.

Figure 6 is a longitudinal vertical section through the machine on line 6—6 of Figure 2.

Figure 7 is a section on line 7—7 of Figure 2.

Figure 8 is a detail section to a larger scale on line 8—8 of Figure 6.

Figures 9 and 10 are detail sections on lines 9—9 and 10—10, respectively, of Figure 8.

Figure 11 is a detail section on line 11—11 of Figure 4.

Figure 12 is a detail section on line 12—12 of Figure 11.

Figure 13 is a detail section on line 13—13 of Figure 2 showing in addition certain of the connecting mechanisms extending lengthwise of the machine.

Figure 13a is a detail section on line 13a—13a of Figure 13.

Figure 14 is a fragmentary plan beneath the cover of a portion of the mechanism shown at the right hand end of Figure 13.

Figure 15 is a detail section on line 15—15 of Figure 14.

Figure 16 is a diagrammatic view of the gear mechanism at the right hand end of Figure 13.

Figures 17 and 18 are fragmentary front elevations at the head and tailstock ends, respectively, of the machine, to a larger scale than Figure 1.

Figure 19 is a fragmentary elevation with parts in section of the left or headstock end of the machine to a larger scale than Figure 2.

Figures 20 and 21 are side elevations of certain parts shown assembled in Figure 19.

Figure 22 is a view similar to a portion of Figure 19 but drawn to a larger scale.

Figure 23 is a view similar to a portion of Figure 22, but showing parts in different positions.

Figure 24 is a view similar to a portion of Figure 12, but to a larger scale and showing certain of the parts illustrated in Figure 22.

Figure 25 is a fragmentary elevation with parts in section of the right or turret end of the machine to a larger scale than Figure 23.

Figure 25a is a fragmentary end elevation of a cam follower carrier.

Figure 26 is a detail section on line 26—26 of Figure 6.

Figures 27 and 28 are detail sections on lines 27—27 and 28—28, respectively, of Figure 26.

Figure 29 is a section on line 29—29 of Figure 26.

Figure 30 is a section on line 30—30 of Figure 27, showing a part broken away to reveal part of the turret locking mechanism and also showing a typical tool set up.

Figure 30a is a fragmentary central section showing the finished work from the set up of Figure 30.

Figure 31 is a detail section on line 31—31 of Figure 30.

Figure 32 is a diagrammatic showing of the drive and control mechanism of the machine.

Figure 33 is a diagrammatic view showing a modification in the speed control.

The machine herein illustrated as embodying the invention, is of the turret lathe type, comprising a bed 1 having a headstock 2 at one end in which is rotatably mounted a work spindle 3 which is shown as provided with a nose 4 at its inner end to which may be secured any suitable form of work holder such as the chuck 5 shown in Figure 30. For operating on the work carried by this spindle, a plurality of tool carriers may be employed. One of these tool carriers, as shown, comprises a tool-carrying turret 6 which is mounted on the bed of the machine for movement parallel to the axis of the work spindle and from and toward the headstock. The means for so moving this turret will later be more fully described.

The turret is provided, as will later more fully appear, with a plurality of tools which may be selectively brought into operative relation to the work by indexing the turret, and provision may be made for rotating such tools. Besides the tools carried by the turret, tools may also be carried by one or more tool carriages which may be caused to traverse the work axially of the work spindle and also be caused to move from and toward the work axis as may be desired to produce the desired machining operations on the work. As shown two such carriages are employed, though more or less might be used in accordance with the requirements of any particular case. One of these carriages, as shown at 10 in Figure 30, is carried on an arm 11 secured to the tool bar 12 which may be rocked as may be found necessary or desirable to produce the desired cutting action on the work.

Another carriage 14 (see Figure 30) may be mounted on an arm 15 clamped or otherwise secured to a rockable and axially movable tool bar 16 which is arranged between the side walls 17 and 18 of the machine bed 1 as shown best in Figure 5. This arrangement of the tool carriages and their supporting bars corresponds to the well known arrangement of the Fay lathe. The means for moving and controlling these carriages will be later more fully described.

*Spindle drive mechanism*

The work spindle 3 is arranged to be rotated through rotation of a driving pulley 20 (see Figure 7) which is journaled on a hollow shaft 21 and to which it is arranged to be clutched as through the friction ring clutch 21a at suitable times. This clutch is actuated by axial movement of a clutch rod 22 slidable through the hollow shaft 21 and engaging the clutch dogs 23 by which pressure may be exerted on or relieved from a ring 24 which engages the clutch rings 25. The rod 22 has a reduced extremity 30 on which is journaled a shifter collar 31, which, as shown best in Figure 10, may be actuated through rack teeth 32 thereon with which mesh teeth of a mutilated gear 33 fixed to a rock shaft 34. This rock shaft 34 extends through the front and back walls of the transmission casing 35 and carries an actuating handle 36 on its forward end by which it may be manually rocked to close or open the clutch 21a. As will later appear, it may be actuated automatically to open the clutch at the end of a complete machine cycle.

The hollow shaft 21 is shown as splined through a portion of its length and on this portion is slidably mounted a collar 36a carrying or integral with a pair of gears 37 and 38 of different sizes. Between the gears 37 and 38 this collar 36a is provided with an annular groove 39 within which may ride elements 40 of a shifter fork 41 (see Figures 8 and 10). This fork is shown as pinned to a rock shaft 42 which extends across the casing 35 and on the forward face of this casing it has secured thereto a lever 43 (see Figure 1) which has a handle 44, the inner end of which may be engaged with either one of a pair of depressions in an arcuate piece 45 secured to or integral with the front face of the casing 35. By this means the rock shaft 42 may be retained in either selected of its angular positions wherein either the gear 37 is in mesh with a gear 50 keyed to a shaft 51, or the gear 38 is in mesh with a gear 52 also keyed to the shaft 51. By this arrangement the shaft 51 may be driven at either of two selected speeds from the hollow shaft 21.

The shaft 51 also has keyed thereto a gear 53 (see Figure 7) which meshes with a gear 54 keyed to a shaft 55. This shaft 55 also has secured thereto a gear 56 and a gear 57 with either of which may be selectively meshed a gear 58 and a gear 59, respectively, slidable axially of a splined shaft 60. As shown in Figure 7, the gear 58 may have a hub portion 61 and the gear 59 may be formed as a ring gear positioned on this hub portion 61 and secured to the gear 58 as by the pins 62. The spacing of the gears 56 and 57 is such that there may be an intermediate position of the gears 58 and 59 wherein neither is in engagement with gears on the shaft 55, this being a neutral position wherein the shaft 60 is not rotated even though the shafts arranged previously in the train are being rotated.

The gears 58 and 59 are arranged to be moved axially between their different positions and for this purpose there may be provided a forked shoe 63 shown in Figures 8 and 9 which may engage on opposite sides of the gear 58. This member 63 is shown as pivotally carried by an arm 64 secured to a rock shaft 65, which projects through the forward face of the casing 35 and has secured thereto an arm 66. The lower end of this arm 66 may be provided with a handle portion 67 which may be engaged at its inner end in any selected of three depressions 68 in an arcuate plate 69, either integral with or secured to the forward face of the casing 35, whereby to secure the arm 67 in any selected of its three angular positions in the middle of which the gears 58 and 59 are in neutral position and in the others of which either one or the other of these gears is in mesh with the corresponding gear carried by the shaft 55. The shaft 60 may thus be driven at any of four selected speeds from the shaft 21 or may be in a neutral idle position. The shaft 60 also carries a pinion 70 which meshes with a gear 71 keyed to the work spindle 3 (see Figures 6 and 8) so that the spindle has four selective speeds or may be idle.

*Turret tool drive mechanism.*—The tools carried by the turret may be rotated and for this purpose driving connections are made from the turret to the spindle driving mechanism. As shown best in Figure 8, the gear 50 carried by the shaft 51 meshes with a gear 80 fixed to a shaft 81 above and arranged parallel to the shaft 51. For convenience for removal or replacement, this shaft 81, as well as others in the train of the turret tool drive mechanism at the headstock of the machine, may be carried within a supplemental gear casing 83 secured to the top of the casing 35 as by the screws 84. The shaft 81 carries a pinion 85 which meshes with a gear 86 fixed to a shaft 87. This shaft 87 carries a pinion 88 which meshes with a gear 89 secured to a sleeve 90. This sleeve 90 is journaled in bearings 91 carried in transverse partition members 92 (see Figure 9) and is internally splined for the slidable reception of a splined shaft 95 which may extend entirely through the casing member 83. At opposite ends of the sleeve 90 this shaft 95 may extend through stationary sleeves 96 which prevent the entry of foreign matter into the casing 83. This shaft 95 has its outer end journaled in bearings 98 at the upper end of a hollow post 100 secured to the top of the tool-carrying turret 6. The shaft 95 carries a bevel gear 101 at its outer end with which meshes a similar gear 102 at the upper end of a vertical turret shaft 103. This turret shaft extends centrally downwardly within the post 100 and in the axis of rotation of the turret, and at its lower end has fixed thereto a bevel gear 104 which meshes with bevel gears 105 secured to the tool-carrying spindles 106. These spindles are radially arranged in the turret about its axis corresponding to the indexed positions of the turret and have suitable tool holders 107 at their outer ends. Due to the fact that the shaft 95 is splined and may slide freely through the driving sleeve 99 at the headstock end of the machine, the turret-carrying tools may be rotated regardless of the axial position of the turret with reference to the work holder, and the driving connections in the turret permit indexing of the turret to permit any desired tool to come into operative relation to the work, these connections being entirely above and out of the way of the indexing mechanism.

*Tool moving and controlling mechanism.*— The various tools carried by the front and rear tool carriages and the turret may be controlled substantially independently of each other, each to perform its own action in the complete machine cycle without limitation by controls necessary or desirable for other tools. As shown the control of such tools is produced by the action of a pair of cam drums, one of these drums shown at 110 controlling the operative motions of the tool carriers supported on the tool bars 12 and 16, and the other cam drum 111 controlling the feed and retractive motions of the tools carried by the turret. These drums are shown best in Figures 1, 4, and 6 and the diagrammatic view, Figure 32. The axial motion of the front tool bar 16 may be controlled by cam elements 112 (see Figure 6) secured to the cam drum 110 which act upon a follower 113 carried by a collar 114 clamped as by the clamp screw 115 to the tool bar 16. This tool bar is shown as slidably and rockably supported in the bearings 116, 117 and 118 and the bar 16 may extend into and be slidable and rockable within a member 119 which forms a part of the turret-carrying saddle 120 and to which a cam follower 121 may be attached for controlling the axial motion of this saddle by suitable cam members carried by the drum 111.

The angular motion of the bar 16 may be controlled by a former cam 125 (see Figures 1 and 5) on which a shoe 126 carried by the tool arm 15 rests, this former cam as shown being adjustably supported on a member 126a slidable on an angularly adjustable guide member 127 secured to the front wall 17 of the bed of the machine. This slide may be connected through a link 128 to a slide member 129 supported in any suitable way for sliding motion lengthwise of the machine and which may have on its inner face a suitable cam follower (not shown) which may be controlled from cam elements secured to the drum 110. This control mechanism may be that shown in the Lovely Patent No. 1,923,493 dated August 22, 1933. Similarly the angular positions of the tool bar 12 may be controlled by the axial position of a former cam 130 secured to a slide 131 mounted on a guide member 132 angularly adjustable with respect to the back wall member 18 of the machine bed. This carriage 131 may be connected through a link 133 (see Figure 4) with a slide member 134 carrying a follower for cooperation with suitable cam elements carried by the drum 110. The bar 12 may also be axially movable if desired, being controlled in this motion by suitable cams in the manners shown, for example, in Figures 29 and 32 of the Lovely patent hereinbefore mentioned. For the particular set up herein shown no axial motion of the back tool carrier 10 is provided, since, as shown in Figure 30, the back tool carrier 10 carries tools which merely face off the ends of the work.

*Cam drum driving mechanism.*—The drums 110 and 111 which control, respectively, the front and back tool carriers, and the advance and retraction of the turret, are arranged to be driven at either of two sets of speeds, a relatively high speed, which in general will be employed during the idle motions of the tools, and a low speed, or any selected of a plurality of low speeds, which in general will be employed when the tools are operating on the work. Provision is also made by which either cam drum may stop and be held stopped during any desired part of the cycle of operations of the machine, since this permits a more extended area of the cam-receiving surface of the drums to be used when actual control is necessary, minimizing the amount of space which is employed during those periods when the cam drum is not called upon to produce motion of its respective controlled members. The cam drum 110 is arranged to be rotated by the rotation of a transverse shaft 200 which is provided with a worm 201 meshing with a worm gear portion 202 of this cam drum. The shaft 200 is arranged to be selectively coupled at one end to a high speed driving mechanism and at the other end to a low speed driving mechanism. The high speed driving mechanism includes a high speed drive shaft 2010 and the low speed drive mechanism includes a low speed drive shaft 2020. The high speed drive shaft 2010 is shown as arranged at the back portion of the machine substantially parallel to the work spindle and to the tool bars 12 and 16. The low speed drive shaft may be similarly arranged along the forward face of the machine.

As shown in Figure 12, the high speed drive shaft 2010 is made for convenience in two sections coupled axially by the coupling 205 which is keyed to both sections. The section 2011 of this shaft 2010 has secured thereto a gear 206 (see Figure 12) which meshes with a gear 207 on the drive shaft of a suitable coolant pump 208. This shaft section 2011 extends into a casing 210 and carries on its inner end a bevel pinion 211. As shown on Figure 11 and diagrammatically on Figure 32, this bevel pinion 211 meshes with a bevel pinion 212 keyed to a shaft 213 and this pinion 212 also meshes with a bevel pinion 214 on a vertical stub shaft 215. This shaft 215 extends through the top of the gear casing 210 and is coupled through a coupling 216 to a jack shaft 217. At its upper end this jack shaft 217 passes into a gear casing 218 and has keyed to its upper end a bevel gear 219 which meshes with a bevel pinion 220 secured to a horizontal shaft 221. The outer end of this shaft 221 outside of the gear casing 218 carries a brake pulley 222 for a purpose which will later appear. This gear casing 218 forms an extension on the back face of the head stock gear casing 35, and the inner end of the shaft 221 projects into the casing 35 and carries a bevel gear 225 with which meshes a small bevel gear 226 secured to the hollow shaft 21 which is driven from the belt pulley 20. Thus the high speed shaft 2010 is driven through an intermeshing train of gears and shafts from the driving pulley 20.

As best shown in Figures 7, 8, and 13, the low speed drive shaft 2020 is driven through a change gear mechanism from the work spindle, a diagrammatic showing of this being indicated in Figure 32. The spindle 3 carries thereon a bevel gear 240 (Figure 8) with which meshes a similar bevel gear 241 carried by a shaft 242 (Figures 7 and 8) which extends out through the side of the casing 35 into a gear box 243 (Figures 7 and 13) secured to the front face of the headstock. This shaft 242 is provided at its outer end with a bevel gear 245 which meshes with a gear 246, shown best in Figure 13 as loose on a vertical shaft 247. This gear 246 may be clutched to the shaft 247, however, as by means of a clutch collar 248 slidably keyed to the shaft 247 and having a clutch face at 249 mating a corresponding clutch face at 250 on the hub of the bevel gear 246. The clutch collar 248 may be moved axially into and out of clutching relation with the gear 246, and for this purpose it may be provided with an annular groove 251 within which rides a roller 252 on an arm 253 carried by a rock shaft 254 (Figure 13a), which extends out through one face of the casing 243. On the outer face of this casing the shaft 254 has fixed thereto an actuating arm 255 which has a handle member 256 provided with an inner end portion which may be engaged selectively in either of a pair of locking depressions 257 in the side wall of the casing 243 (Figures 3 and 5). In the normal condition of the machine the clutch collar 248 is in its lowered position so that the beveled gear 246 is clutched to the shaft 247. The lower end of the shaft 247 passes into a gear box 260 within which is positioned a speed reducing gear mechanism shown diagrammatically in Figure 32 and as actually constructed in Figure 13. The lower end of the shaft 247 carries a bevel gear 265 which meshes with a bevel gear 266 on a shaft 267. This shaft 267 carries a pinion 268 which meshes with a gear 269 carried by a shaft 270. The shaft 270 also carries a pinion 271 which meshes with a gear 272 carried by a shaft 273. This shaft 273 also carries a gear 274 which meshes with a larger gear 275 on the shaft 276. This shaft 276 also carries a pinion 277 which meshes with a gear 278 journaled on the shaft 200, which, as before described, carries the worm 201 by which the cam drum 110 is rotated.

The shaft 200 may be driven selectively either from the high speed shaft 2010 or from the low speed shaft 2020. When it is desired to drive from the low speed shaft the gear 278 may be clutched to the shaft 200 (see Figure 11), this being shown as accomplished through a slidable clutch collar 280 keyed to the shaft 200 and arranged to be brought into clutching engagement with a clutch element 281 secured to or integral with the gear 278. This collar 280 may be shifted into or out of clutching relation by the shifter lever 290 pivotally connected at its outer end to the shifter rod 291, which extends from front to back of the machine at the headstock end (Fig. 2). The opposite end of the rod 291 is connected to a clutch shifting lever 292 pivoted at 293 and which engages an annular groove in a clutch collar 294 also slidably keyed to the shaft 200. This clutch collar is provided with a clutch face 295 which may be brought into clutching engagement with a mating clutch element 296 fixed to a stub shaft 297. This stub shaft has journaled thereon a gear 298 which is in mesh with a gear 299 keyed to the shaft 213, so that the gear 298 is driven continuously from the high speed shaft 2010. The stub shaft 297 may be clutched to the gear 298 to be driven therefrom through the double clutch collar 300 slidable on a splined portion of the stub shaft 297, and when the gear 298 is so clutched to the stub shaft 297 and the stub shaft is coupled to the drum drive shaft 200 through the clutch 296, the drum is driven from the high speed shaft, at this time the clutch 280 being unclutched from the low speed drive shaft connections. While the clutch collar 294 is in closed position, however, the clutch 300 may be moved to disconnect the gear 298 from the stub shaft 297 and to lock the stub shaft 297 against rotation by engagement of its outer clutch face with a stationary clutch element 301 secured to the gear casing 210. This clutch collar 300 may be moved from one to the other of its positions by means of a shifter lever 302, the control of which will be later described.

In a somewhat similar manner the cam drum 111 may be driven from either the high speed shaft 2010 or the low speed shaft 2020 and the connections for doing this will now be described. The high speed shaft 2010, at its end remote from the headstock of the machine, carries a bevel gear 310 meshing with a bevel gear 311 carried by a shaft 312 (see Figure 32). This shaft 312 also carries a gear 313 meshing with a gear 314. This gear 314 is journaled on a stub shaft 315 which is identical with the stub shaft 297 shown in Figure 11 and is arranged to be coupled either to this gear or to a fixed clutch element 317, shown diagrammatically in Figure 32, by a double faced clutch collar 318 identical with the clutch collar 300 shown in Figure 11. The clutch collar 318 is arranged to be shifted by a shifter lever 319 identical with the lever 302 at the opposite end of the machine. The stub shaft 315 may be connected to drive the drum drive shaft 320 for the cam drum 111 and this shaft 320 may carry a worm 321 meshing with a worm gear portion 322 of the drum 111 similarly to the driving arrangement for the cam drum 110 which has been previously described. When the shaft 320 is coupled to the stub shaft 315 by the clutch collar 323, the drum 111 will be driven from the high speed drive shaft 2010 when the clutch collar 315 is in one position and locked against motion when the collar 315 is in clutching engagement with the stationary clutch element 317. The drum drive shaft 320 may also be driven from the low speed drive shaft 2020 and at any selected of a plurality of speeds. When the clutch collar 323 is moved out of clutching engagement with the high speed drive shaft 2010 it is normally put in driving relation with the low speed drive shaft 2020 through a sliding clutch 325 actuated by a shifter lever 326 and connected to the shifter lever 327 for the clutch collar 323 through the rod 328 (see Figures 3, 25, and 32).

The shaft 2020 is driven directly from the shaft 267 through the intermeshing bevel gears 330 and 331 on these shafts, respectively, at the headstock end of the machine within the gear casing 260. The opposite end portion of the shaft 2020 is shown as connected to a stub shaft 335 (see Figure 13) through a coupling 336, which is shown as keyed to the shaft 2020 and pinned to the shaft 335. An enlarged diagram of the driving connections from the shaft 335 to the drum shaft 320 is shown in Figure 16. The shaft 335 extends into a gear casing 340 and has fixed to its inner end a bevel pinion 341. This pinion meshes with a bevel gear 342 fixed to a shaft 343 within the casing 340 and this shaft 343 carries a pinion 344 meshing with a gear 345 fixed to a shaft 346. The shaft 346 has journaled thereon a pinion 347 which may be coupled thereto through a clutch collar 348 slidably keyed to the shaft 346. This pinion 347 meshes with a gear 349 journaled on the shaft 350 and rotatable with the gear 349 is a pinion 351 which meshes within a gear 352 journaled on a shaft 353. Mounted to rotate with the gear 352 is a pinion 354 which meshes with a gear 355 journaled on a shaft 356 which may be coupled for rotation therewith by a clutch collar 357 splined to the shaft 356. This clutch collar 357 is a double faced clutch so that it may be brought into clutching engagement with the gear 355 to clutch it to the shaft 356, or it may be brought into clutching relation with a gear 358 also journaled on the shaft 356. This gear 358 is in mesh with the gear 359 keyed to the shaft 350. There is, therefore, a drive for the shaft 356, when the clutch 357 engages the gear 355 and the clutch 348 engages the gear 347, through the gear 355, pinion 354, gear 352, pinion 351, gear 349, pinion 347, gear 345 and pinion 344 from the shaft 343. When the clutch collar 357 engages the gear 358 there is a drive of the shaft 356 through the gear 358, the gear 359 on the shaft 350, and the gear 360 keyed to the shaft 350 and meshing with the gear 361 also keyed to the shaft 343. When the clutch collar 348 is moved out of engagement with the pinion 347 a slidable clutch collar 362 on the shaft 353 is moved into clutching engagement with the gear 352, and in this position of the parts the drive of the shaft 356, when the clutch collar 357 is in clutching relation to the gear 355, is through the gear 355, the pinion 354, the shaft 353, the pinion 363 keyed to the shaft 353 and the gear 364 keyed to the shaft 343. These trains of gears are arranged to drive the shaft 356 at any of three different selected speeds. The clutch collars 348 and 362 are provided with shifter forks 368 and 369, respectively, secured to a shaft 370 so that they are moved simultaneously to throw one clutch in as the other is thrown out. The shaft 370 has fixed thereto an actuating arm or lever 371. The clutch collar 357 is actuated by a shifting yoke 374 fixed to a shaft 375 to which is secured a lever 376. The levers 371 and 376 are actuated by suitable cam mechanism which will later be more fully described. The shaft 356 has pinned thereto a pinion 380 which meshes with a gear 381 journaled on the shaft 320 and arranged to be clutched thereto by the clutch 325.

It will be seen that the drum 111 may be rotated at a relatively fast rate from the high speed shaft 2010 or at any one of three relatively low rates of speed for any selected speed of the work spindle, three speed changes being obtained from the mechanism within the gear box 340. In addition to this the spindle itself may be driven at either of two selected speeds from the drive mechanism. The drum 110 may be driven at one relatively high speed from the high speed shaft 2010 and at one relatively low speed for each speed of the spindle, through the gear mechanism in the box 260.

It is, of course, desirable in the operation of the machine that when the low speed clutches 280 and 325 are disconnected, the high speed clutches 294 and 323 shall be connected. Provision is therefore made by which under normal running conditions the actuating rods 291 and 328 for these clutches are thrown completely from one to the other of their clutching positions. For this purpose what are known as "load and fire" mechanisms may be employed. While such mechanisms will be described more completely with reference to other parts of this machine, they are shown in Figure 32 as positioned at 390 and 391, being formed as spring latches which cooperate with cam-actuated levers 392 and 393 which are connected to the rods 291 and 328, respectively. It is, however, convenient when setting up the machine to permit the drums 110 and 111 to be turned over by hand. For this purpose means may be provided for latching the rods 291 and 328 in intermediate positions where the drum drive shaft 200 and 320 will be out of clutching engagement at both ends. The locking means for the rod 328 is shown best in Figures 18 and 25. The rod 328 is provided with a handle 400 at one end and is also provided with a hole 401 through which may be projected a latch pin 402 which is normally held retracted by a spring at 403 but which can be pulled out into latching position by means of a cross pin 404 which may be turned to rest in a groove 405 which holds it in projected position. In its retracted position it rides in a slot 406 in its supporting casing 407. The rod 291 may be latched in its intermediate position in a similar manner. When either of these rods 291 or 328 is so latched the corresponding drum shaft 200 or 320 may be rotated by hand, each of these shafts having a squared end such as 410, 411 on which a hand crank may be fitted.

Beside the cam mechanism for shifting the rod 291, this rod may be shifted by hand. For this purpose a hand lever 415, shown best in Figures 17 and 19, is carried by the cam follower carrier 416. This carrier is pinned to a vertical shaft 417, the lower end of which carries an arm 418. The outer end of the arm 418 engages in a slotted lug 419 secured to the rod 291.

*Turret indexing and control mechanism*

The turret-moving drum 111 is arranged to be rotated once for each indexed position of the turret, and indexing mechanism of any desired type, as well as the control mechanism for the entire machine cycle of the turret, may be driven from this drum 111. The drum 111 is shown as provided with a shaft 450, which carries a pair of gears 451 and 452. The gear 451 meshes through a train of gears 453, 454 and 455 suitably journaled, with a gear 456 carried by a splined shaft 457. Axially movable on this shaft is a bevel gear 458 meshing with a bevel gear carried by a shaft 459, which, as shown best in Figures 27 and 28, is journaled in a housing 460 secured to the saddle member 461 of the turret. The upper end of this shaft 459 carries a gear 465 which meshes with a gear 466 journaled on the stub shaft 467. This gear 466 in turn meshes with a large gear 468 journaled on a post 469.

This gear 468 carries on its upper face a post 470 which cooperates with slots 471 of a Geneva wheel 472 secured to the under face of a large gear 473, so that as the gear 468 is turned the Geneva wheel and the gear 473 are turned intermittently. The Geneva wheel is also provided with arcuate peripheral indentations 474 with which cooperate a cam extension 475 on a locking collar 476 movable with the gear 468. The cam extension 475 is provided with an arcuate outer face 477 which may engage in these recesses 474 of the Geneva wheel to hold the Geneva wheel against rotation during the interval between step by step motions. The gear 473 meshes with a smaller gear 480 carried by the shaft 481, which constitutes the pivot of rotation of the turret 6. This turret 6 is shown as rotatably supported on the circular boss 482 of the turret slide or saddle, the boss and the turret having adjacent peripheral extensions 483 and 484 about which is engaged a brake band 485 which may be tightened to hold the turret in any of its indexed positions to the saddle to prevent tilting of the turret due to the thrust on the turret tools. There is also provided a locking pin shown at 490 which may engage in recesses such as 491 in a ring member 492 seated in an annular recess 493 in the lower face of the turret 6, as shown best in Figure 27, to retain the turret in indexed angular positions. This locking pin is retracted just prior to an indexing movement and is then released to permit it to snap into a succeeding locking aperture of the turret for a succeeding indexed position thereof. For the purpose of actuating this locking pin in proper timed relation, it is shown as provided with a slot 495 within which engages the extremity 496 of an actuating rocker 497 which is journaled on a shaft 498 arranged transversely of the turret slide. This member 497 is provided with a pair of upstanding lugs 499 and 500. Against one of these lugs such as 499 bears a spring-pressed plug 501 seated in a socket member 502 which is shown as carried by a plug 504 threaded into the side wall of the turret slide. This spring plunger acts to normally hold the member 497 rocked to a position in which the locking pin 490 is projected against the locking ring 492 of the turret. The other lug 500 on the rock member 497 has bearing thereon one end of a thrust rod 506 slidable through a pair of bearing members 507 and 508. This rod 506 is normally pressed away from the lug 500 as by means of a spring 510 shown as reacting between the bearing member 507 and a collar 511 pinned to the rod 506. The opposite end of the rod 506 bears against the end portion 514 of a cam lever 515 having a cam follower roll 516 at its opposite end which bears against the side face of the cam collar 476. These parts are so related that just as the Geneva wheel lug 470 enters one of the slots 471 of the Geneva wheel, the cam extension 475 comes into contact with the cam roller 516 and starts to swing the lever 515 in a direction to press the rod 506 to the left as shown in Figure 26, which acts on the lug 500 to rock the member 497 in a direction to withdraw the turret locking pin 490. The arcuate face 477 of the cam collar 476 holds the pin retracted until the indexing motion is substantially complete, whereupon the spring 510 may return the rod 506 to its right hand position with the end 514 of the lever 515 bearing against an adjustable stop screw 518. Journaled on the pivot 519 of the lever 515 is a gear segment 520 which has teeth meshing which a segment 521 journaled on a pivot 522. This segment 521 has a hub portion 523 (see Figure 29) having an extension arm 524. The end of this extension arm is pivotally connected as at 525 to a link 526. The opposite end of the link 526 is pivoted at 527 to an arm 528. This arm 528, as shown best in Figure 30, is carried by a rock shaft 529 having a flattened portion 530. This flattened portion 530 projects into a triangular opening 531 in a link 532 which is pivoted at 533 to one end of the brake band 485. As shown best in Figure 30, this brake band is formed in two parts, adjacent ends being adjustably secured together as by the screw 535. To the opposite end of the brake ring formed by these two parts is pivoted as at 540 a link 541. The link 541 has a forked extremity between the parts of which the link 532 extends and through both portions of this forked extremity as at 542 and 543 is formed a triangular opening 545 shown in dotted lines in Figure 30. Rocking of the arm 528 in a counter-clockwise direction from the position shown in Figure 30, causes the flattened portion 530 of the pivot of the arm 528 to engage on the diagonal faces of these triangular slots, forcing the links 532 and 541 to come together, thus tightening the brake band 485 about the lower portion of the turret and the mating portion of the turret saddle so as to clamp these parts firmly together in indexed position. Rocking of the arm 528 thereafter in the opposite direction into the position shown in Figure 30 releases this band brake and permits indexing of the turret as soon as the locking pin is released. Actuation of this brake mechanism to clamp the turret in an indexed position is accomplished by the impingement on the segment 520 of a roller 550 journaled on a pin 551 on the lower face of the gear 468. Releasing of the turret clamp is accomplished by impingement of the Geneva pin 470 on the side of a striker plate 555 secured to or integral with the hub 523 just before this Geneva pin enters one of the slots 471 of the Geneva wheel. It will thus be seen that the indexing of the turret and its locking in indexed positions are controlled through mechanism which drives the drum 111, which drum also produces the motions of the turret saddle toward and from the work spindle.

Cam drum speed and stopping and starting control

These controls are driven directly from the driving mechanism for the cam drums. The control for the cam drum 110 consists of a supplemental cam drum 600 carried by the shaft 601 to which the cam drum 110 is secured. This cam drum 600 therefore rotates once for each rotation of the cam drum 110 and one rotation of each is produced during the complete cycle of operations of the machine. As before noted, however, the cam drum 111 rotates once for each indexed position of the turret. Its speed and stopping and starting control comprises the supplemental cam drum 605 which is also arranged to rotate once during each complete machine cycle. It therefore rotates slower than the cam drum 111, its rate depending on the number of indexing stations for the turret. As shown it is driven by the gear 452 carried by the shaft 450 which also carries the cam drum 111. This gear 452 meshes with a gear 606 (see Figure 3) carried by a shaft 607 (see Figure 32). The shaft 607 carries a pinion 608 which meshes with a gear 609 carried by a hub portion 610 within the interior of the drum 605.

The drum 600 is provided with suitable peripheral grooves to which may be attached angularly as desired, cams which may act on the speed controlling lever 392 to throw in the high or low speed drives for the shaft 200 as has been previously described. The cam drum 605 may be similarly formed to hold cams for actuating the shift arm 393 to similarly control the position of the shift rod 328 so as to determine whether the cam drums 111 and 605 shall be driven from the high speed shaft 2010 or the low speed shaft 2020.

Suitable cams on the cam drum 605 may also be employed to determine the positions of the speed changing arms 371 and 376 (Figures 13 to 16) to determine the speed with which the drum 111 shall be rotated through the slow speed drive shaft 2020. It is desirable that the shifting of these speed changing clutches shall be effected quickly, but due to the relatively slow rotation of the cam drum 605, the action of the cams to move their followers is relatively slow. In order that this slow motion of the cams may act to produce a quick throw of the speed controlling clutches at the proper times, special connections to the clutch throw arms 371 and 376 are provided. such mechanism being illustrated in Figures 13, 14, and 15. The diagrammatic view, Figure 16, for convenience, shows merely conventional link connections. Referring to Figures 13, 14, and 15, the arms 371 and 376 are formed with end slots 620 and 621, respectively, within which ride posts 622 and 623 on levers 624 and 625 which are journaled on the shafts 370 and 375, respectively. The opposite ends of the arms 371 and 375 are connected through the links 630 and 631, respectively, to the cam follower levers 632 and 633, respectively. These cam follower levers have cam follower rolls 634 and 635, respectively, which may be engaged by suitable cams carried by the drum 605. The levers 632 and 633 are provided with oppositely beveled plugs 636 and 637 forming part of load and fire mechanisms, with which cooperate spring pressed beveled latches 638 and 639 fixed to the frame of the machine in any suitable manner (see Figure 18). These load and fire mechanisms comprising the beveled plugs and their cooperating beveled latch pins tend to hold the cam arms 632 and 633 yieldingly in either of their two angular positions. The first portions of the motions of these links are gradual as their actuating cams pass into contact with their respective follower rollers 634 and 635 until the points of the plugs 636 and 637 pass by their respective latch elements, whereupon they are snapped quickly to their opposite positions. During this initial relatively slow motion of their respective cam followers, the posts 622 and 623 ride freely within the slots 620 and 621, respectively, but as soon as either of the load and fire mechanisms snaps the corresponding cam lever to its opposite position, the corresponding posts 622 or 623 snap against the opposite end of the corresponding slot and rock the corresponding arms 371 or 376 quickly to its opposite angular position thus to effect a quick throwing of the speed changing clutches.

Beside the speed changing mechanisms operated by cams on the drums 600 and 605, there may also be cams on these drums for actuating the respective clutch throwing arms 302 and 318 so as to disconnect the high speed drive shaft 2010 from driving connection with the cam drums 110 or 111, even though the high speed clutches 294 and 323 are in closed position, thus to stop the rotation of the respective cam drum 110 or 111. The clutch lever 302 is arranged to be actuated by a rock lever 650 pivoted at 651 (see Figures 19 to 24). It may be actuated by means of a bell crank lever 652 journaled on the same axis 651 and having on its arm 653 a latch 654, which, as shown best in Figure 21, is pivoted at 655 to the arm 653 and is backed up by a spring pressed plug 656. This spring pressed plug tends to hold the latch member 654 with a notch 657 therein in engagement with a pin 658 on one end of the lever 650. This lever 650 is provided with a beveled ended plug 660 which cooperates with an oppositely beveled latch pin 661 pressed outwardly by the spring 662 (Figure 23), these two parts forming a load and fire mechanism tending to hold the member 302 in either of its two positions, in one of which the stub shaft 297 is locked in stationary position and in the other of which this stub shaft is clutched to its driving gear 298, as previously described. When the latch 654 engages the pin 658, rocking motion imparted to the lever 652 correspondingly rocks the lever 650 and the clutch arm 302. The lever 652 is connected through the link 665 with the rock arm 666, which is fulcrumed at 667, and carries a cam follower 668 which may be contacted by a cam 669 carried by the cam drum 600, the parts being so arranged that when the cam 669 strikes the follower 668 and rocks the arm 666, the arm 653 is rocked in a direction to move the clutch lever 302 to disconnect the stub shaft 297 from its driving gear 298 and lock it against rotation, so that when the drum drive shaft 200 is clutched to this stub shaft, this drive shaft is also locked against rotation so that both the cam drums 110 and 600 are stationary. The cam follower 668 is yieldingly held in position to be actuated by the cam 669 by a spring pressed plug 670 which presses the lever 652 against a stop screw 671. While each cam drum 110 and 111 may stop itself, it cannot start itself. The starting of rotation of the drum 110, therefore, must be produced by other means, and as shown this starting is produced by cams on the drum 605 at the opposite end of the machine. By means which will now be described this starting of the rotation of the cam drum 110 and the drum 600 connected thereto, is produced by the rocking by the drum 605 of a rock shaft 680 which extends along the back of the machine from one end to the other. At the headstock end of the machine (Figures 19, 23, and 32) this rock shaft carries an arm 681 having a roller 682 journaled at its outer end in position to strike on the beveled face 683 of the latch 654 and remove it from engagement with the pin 658 so as to release the latch therefrom, and then to move further in the same direction into contact with the pin 659 so as to rock the lever 650 in a direction to throw the clutch lever 302 to clutch the stub shaft 297 to its driving gear 293, the load and fire mechanism acting on the member 660 insuring the completion of this throw. After the arm 681 has been so rocked it returns to its initial position shown in Figure 23 and in full line position in Figure 19. The rock shaft 680 is rocked in this manner by a cam 690 (see Figure 25) on the cam drum 605. This cam 690 strikes a cam follower 691 fulcrumed at 692 on a support 693 secured to the machine frame and rockable with this cam follower 691 is an arm 694 to which is pivoted the lower end of a link 695. The upper end of this link is shown as pivoted to an arm 696 pinned to the rock shaft 680. The rock shaft is returned to its inactive angular position when free from the action of its actuating cam by any suitable means, a spring 697 engaged at one end over a pin 698 on the arm 696 and at the other at a fixed pin 699 being shown for this purpose in Figure 25.

Means actuated by a cam on the drum 605 may be employed to stop the rotation of this drum and the drum 111 similarly to the self-stopping means for the drums 110 and 600. This is shown in Figure 25, the stop cam being indicated at 700. This cam impinges on a cam follower 701 fulcrumed at 702 on the fixed support 703. Rockable with this cam follower is an arm 704 to which is pivotally connected one end of a link 705. The opposite end of this link 705 is pivoted at 706 to a bell crank lever 707 which is similar to the lever 652 at the opposite end of the machine. This lever 707 carries the spring latch 708 similar to the latch 654 heretofore described, and this latch has a slot 709 which may engage over a pin 710 in a lever 711 similar to the lever 650 at the headstock end of the machine. This lever 711 is coupled to the shift lever 319 for the clutch collar 315, these parts being arranged in the same manner as at the headstock end of the machine. By the actuation of this cam follower 701 of the cam 700, the drum-driving shaft 320 may be locked against rotation in the same manner that the shaft 200 at the headstock end of the machine is locked by shifting of the clutch collar 297. The cam follower 701 is normally held in the path of the cam 700 by the spring pressed plug 713 which presses the lever 707 against the stop 714.

The initiation of rotation of the cam drums 111 and 605 is produced from the cam drum 600 and this is done through the rock shaft 680. The starting cam on the drum 600 for the drums 111 and 605 is shown at 720 on Figure 19. This acts on a follower 721 fulcrumed at 722 and actuating an arm 723 which is connected through a link 724 to an arm 725 secured to the rock shaft 680. Also rockable with this shaft at its other end (see Figure 25) is an arm 726 having a roller 727 journaled on its outer end, which is arranged to contact with the beveled portion 728 of the latch member 708 so as to first release this latch from the pin 710 and later to impinge on the pin 719 and rock the lever 711 to throw the clutch 315 into clutching engagement with the driving gear 314. Thus before either of the cam drums 600 or 605 is stopped, the rotation of the other must be insured in order that the machine may complete its cycle of operations, and this is done by providing a starting cam for the drum at the other end of the machine which is actuated just prior to its own stopping. This starting cam, as has been previously described, acts to rock the rock shaft 680 in such a direction as to start the rotation of the cam drum at the opposite end if it is not already in driven relation.

The entire machine may be stopped at the end of the operative machine cycle as by a suitable cam (not shown) secured to the cam drum 600 at the headstock end of the machine (Figures 2 and 19). This cam element may impinge on a cam follower on an arm 732 shown best in Figure 19. This arm 732 is shown as fulcrumed at 733 and to its outer end is pivoted at 734 on the lower end of a link 735. This link 735 is pivoted at its upper end to an arm 736 (see Figure 2) fixed to a rock shaft 737. As shown best in Figure 1, this rock shaft 737 carries on its end a latch lug 738 which, when the shaft 737 is rocked by the cam, trips the handle 36, disconnecting the headstock clutch 21a. At the same time the shaft 34, which actuates this clutch, rocks an arm 740 on the back of the machine (see Figure 4) which acts through a link connection 741 to apply a band brake 742 to the brake pulley 222 to stop the machine as previously described.

In Figure 33 a modified speed control is shown particularly intended for actuating the speed control mechanism where the headstock drive mechanism is that shown in the Lovely Patent No. 1,923,493. In this case the speed control cam 750 is carried by the cam drum 605 and acts through a follower arm 751, a link 752, a bell crank lever 753, a link 754, and a bell crank lever 755 to a link 756, which corresponds to the link 142 shown in Figure 1 of this Lovely patent, and controls by its position the speed changing mechanism in the headstock. This provides for an additional speed change in the spindle drive which is not shown in the simplified spindle drive mechanism illustrated in the present application and is desirable where the work has portions of greatly differing diameters in order that the cutting speed of the tools be substantially constant.

In order to facilitate adjustment of the cam elements on the various cam drums, means may be provided by which the various cam follower elements may be retracted. Such a construction is shown in detail in Figures 16 and 25, and 25a in which the follower roll is shown as mounted on a slidable carrier 800 spring pressed outwardly and provided with a pin 801 which may rest in a slot 802 in the carrier when the cam follower is in operative position but which may be pulled rearwardly out of the slot 802 and turned to seat in a shallow groove 803 in the carrier to hold the follower retracted. Each follower arm may also be provided with an offset shoulder portion provided with an opening such as 806 in which a bar may be inserted by which the follower arms may be rocked by hand independent of its actuating cam.

In Figures 30 and 30a is illustrated one piece of work which may advantageously be machined by this machine, this being shown merely by way of example. It should be understood, of course, that work of a great variety of types could be advantageously machined by the machine illustrated. Referring to these figures, the work is shown at 850 and in Figure 30 it is shown as having the first operation by the turret tools being performed thereon. This operation is a rough boring operation produced by the rotary drill 851 drilling out the portions 852, 853, and 854 and the tool part 855 drilling out the wall member 856. In a succeeding turret position rough boring tools 857, 858, and 859 come into operation. These are followed in the third indexed position by finish boring tools 860, 861, and 862. The final operation on these parts of the work is by the reamer 865 in the fourth indexed position. These operations finish the interior of the work as shown in Figure 30a. During the complete cycle of operations side turning roughing and finishing tools 866 and 867, respectively, are turning the rim 868 of the work, these turning tools being carried by the front tool carriage 14, and rough and finish facing tools 870 and 871, respectively, carried by the back tool carriage 10 are facing off the outer end face of the work.

From the foregoing description of certain embodiments of this invention, it should be evident to those skilled in the art that various changes and modifications may be made without departing from the spirit or scope of this invention as defined by the appended claims.

We claim:

1. A machine of the class described, having a work holder, a tool holder, and means for relatively moving said holders to cause successive tooling operations on work, said moving means including two sets of actuating mechanism one of said sets having a cycle of operations complete for each tooling operation and the other set having a cycle of operations complete for a complete cycle of tooling operations, and including means actuated by mechanism of each set for at least partly controlling the operations of the mechanism of the other set.

2. A machine of the class described having a work holder, a tool-carrying turret, a rotary cam-carrying drum, operative connections between said drum and turret for moving said turret toward and from said work holder in each complete rotation of said drum, means indexing said turret at the end of each rotation of said drum, a second rotary cam-carrying drum arranged to rotate once for each machine cycle including a plurality of indexed positions of said turret, the cam elements of said second drum being arranged independently of each other corresponding to the several indexed positions, means actuated by the cam mechanism controlled by said second drum for at least partly controlling the rotation of said first mentioned drum, and means controlled by said first drum for at least partly controlling the rotation of said second drum.

3. A machine of the class described having a work holder, tool-carrying members, a pair of rotary cam-carrying drums for controlling the relation of said members to said holder, drum-driving means, means controlled by each drum for operatively disconnecting it from said driving means, and means controlled by each drum for operatively connecting the other of said drums to said driving means.

4. A machine of the class described having a work holder, a tool-carrying member, a rotary cam-carrying drum, operative connections from said drum for moving said member toward and from said work holder, a tool carrier, a second rotary cam-carrying drum controlling the position of said tool carrier, means for rotating said drums, means controlled by each drum for disconnecting it from said rotating means, and means controlled by each drum insuring the operative connection of the other drum to said rotating means prior to its own disconnection therefrom.

5. A machine of the class described having a work holder, a tool-carrying member, a rotary cam-carrying drum, operative connections from said drum for moving said member toward and from said work holder, a tool carrier, a second rotary cam-carrying drum controlling the position of said tool carrier, means for rotating said drums at any of a plurality of selected speeds, means controlled by each drum for disconnecting it from said rotating means, means controlled by each drum for selecting its own speed of rotation, and means controlled by each drum insuring the operative connection of the other drum to said rotating means prior to its own disconnection therefrom.

6. A machine of the class described having a work holder, a plurality of tool carriers, a rotary cam drum controlling the position of each carrier, means for rotating said drums, means controlled by each drum for stopping its own rotation, and means controlled by each drum insuring the rotation of at least one of said drums at all times during a complete cycle of the machine.

7. A machine of the class described having a work holder, a plurality of tool carriers, a rotary cam drum controlling the position of each carrier, means for rotating said drums, means controlled by each drum controlling its own speed of rotation, means controlled by each drum for stopping its own rotation, and means insuring the rotation of at least one of said drums at all times during a complete cycle of the machine.

8. A machine of the class described having a work holder, a pair of tool carriers, a rotary cam drum controlling the position of each carrier, means for rotating said drums, means controlled by each drum for stopping its own rotation, and means controlled by each drum insuring the rotation of the other drum prior to the stopping of its own rotation.

9. A machine of the class described having a work holder, a pair of tool carriers, a rotary cam drum controlling the position of each carrier, means for rotating said drums, means controlled by each drum for stopping its own rotation, means controlled by each drum controlling its own speed of rotation, and means controlled by each drum insuring the rotation of the other drum prior to the stopping of its own rotation.

10. A machine of the class described having a work holder, a plurality of tool carriers, a rotary cam drum controlling the position of each carrier, means for rotating each drum at any selected of a plurality of speeds, means controlled by each drum for selecting its own driven speed, means controlled by each drum for stopping its own rotation, and means controlled by each drum for insuring the rotation of another drum before stopping itself.

11. A machine of the class described having a rotary work holder, a plurality of tool carriers, a rotary cam drum controlling the position of each carrier, means for rotating said work holder at any selected of a plurality of speeds, a rotary shaft driven by said rotating means, a rotary shaft driven from said spindle, means for rotating said drum selectively at different speeds from one or the other of said shafts, means for rendering one of said shafts operative or inoperative to drive each drum, means on each drum for selecting the shaft from which it is driven, means controlled by each drum for placing its rendering means in inoperative condition, and means controlled by each drum for insuring that the rendering means for another of said cam drums is in operative condition before causing its own rendering means to be in inoperative condition.

12. A machine of the class described, having a rotary work holder, a plurality of tool carriers, a plurality of rotary cam drums controlling the positions of said carriers, means for rotating said work holder at any selected of a plurality of speeds, a rotary shaft driven by said rotating means, a second rotary shaft driven from said spindle, means selected by each cam drum for rotating itself from either of said shafts, means controlled by each drum for interrupting the driving connections thereto from one of said shafts and stopping its own rotation, and means controlled by each drum before it interrupts its own driving connection to insure the non-interruption of the driving connection for another of said drums.

13. A machine of the class described, having a rotary work spindle, a plurality of tool carriers, a plurality of rotary cam drums controlling the position of said carriers, means for rotating said spindle at any selected of a plurality of speeds, a rotary shaft driven by said rotating means, a second rotary shaft driven from said spindle, means selected by each cam drum for rotating itself from either of said shafts, means controlled by each drum for interrupting the driving connections thereto from the first-mentioned shaft and stopping its own rotation, and means controlled by each drum before it interrupts its own driving connection to insure the non-interruption of the driving connection for another of said drums.

14. A lathe having a headstock provided with a work spindle, a tool carrier movable toward and from said headstock substantially parallel to the axis of said spindle, a tool carrier movable toward and from said axis, a cam drum at the headstock end of said lathe, a cam drum spaced from said first-mentioned cam drum, operative connections from each of said drums for controlling one of said tool carriers, means for rotating said work spindle, means driven from said rotating means for rotating said drums, means controlled by each drum for stopping its own rotation, and means insuring the rotation of at least one of said drums at all times during a complete cycle of the machine.

15. A lathe having a bed, a headstock on one end of said bed and having a rotary work spindle, a tool-carrying member movable along said bed toward and from said headstock, a tool carriage traversable on said bed lengthwise of said spindle and movable toward and from the axis of said spindle, a rotary cam drum beneath said headstock, connections from said drum for moving said carriage, a rotary cam drum beneath said tool-carrying member, connections from said second-mentioned cam drum for moving said member, high and low speed driving shafts extending along said bed, means for rotating said high speed shaft and said spindle, said spindle rotation being at a selected of a plurality of speeds, driving connections between said spindle and said low speed driving shaft, selective connections from said shafts to each drum controlled by the same drum for rotating each drum, a clutch in the connection between one of said shafts and each of said drums, means controlled by each drum for opening the clutch in the connection to the same drum, and means controlled by each drum insuring the closing of the clutch to the other drum before its own clutch is opened.

16. A lathe having a bed, a headstock on one end of said bed and having a rotary work spindle, a tool-carrying member movable along said bed toward and from said headstock, a tool carriage traversable on said bed lengthwise of said spindle and movable toward and from the axis of said spindle, a rotary cam drum beneath said headstock, connections from said drum for moving said carriage, a rotary cam drum beneath said tool-carrying member, connections from said second-mentioned cam drum for moving said member, high and low speed driving shafts extending along said bed, means for rotating said high speed shaft and said spindle, said spindle rotation being at a selected of a plurality of speeds, driving connections between said spindle and said low speed driving shaft, selective connections from said shafts to each drum controlled by the same drum for rotating each drum, a clutch in the connection between one of said shafts and each of said drums, means controlled by each drum for opening the clutch in the connection to the same drum, means controlled by each drum insuring the closing of the clutch to the other drum before its own clutch is opened, and means acting when each clutch is opened to lock the corresponding drum against rotation while it is selectively connected to said one shaft.

17. A lathe having a bed, a headstock on one end of said bed and having a rotary work spindle, a tool-carrying member movable along said bed toward and from said headstock, a tool carriage traversable on said bed lengthwise of said spindle and movable toward and from the axis of said spindle, a rotary cam drum beneath said headstock, connections from said drum for moving said carriage, a rotary cam drum beneath said tool-carrying member, connections from said second mentioned cam drum for moving said member, high and low speed driving shafts extending along said bed, means for rotating said high speed shaft and said spindle, said spindle rotation being at any selected of a plurality of speeds, driving connections between said spindle and said low speed driving shaft, selective connections from said shafts to each drum controlled by the same drum for rotating each drum, a clutch in the connection between one of said shafts and each of said drums, means controlled by each drum for opening the clutch in the connection to the same drum, a clutch shaft extending along said bed, mechanism between said clutch shaft and said clutches insuring closing of either clutch which may be open when said shaft is turned in one direction, and means controlled by each drum for so turning said shaft before its own clutch may be opened to thereby insure the rotation of the other drum before either drum may stop by opening of its clutch.

18. A lathe having a bed, a headstock on one end of said bed and having a rotary work spindle, a tool-carrying member movable along said bed toward and from said headstock, a tool carriage traversable on said bed lengthwise of said spindle and movable toward and from the axis of said spindle, a rotary cam drum beneath said headstock, connections from said drum for moving said carriage, a rotary cam drum beneath said tool-carrying member, connections from said second-mentioned cam drum for moving said member, high and low speed driving shafts extending along said bed, means for rotating said high speed shaft and said spindle, said spindle rotation being at a selected of a plurality of speeds, driving connections between said spindle and said low speed driving shaft, selective connections from said shafts to each drum controlled by the same drum for rotating each drum, a clutch in the connection between one of said shafts and each of said drums, means controlled by each drum for opening the clutch in the connection to the same drum, a rock shaft extending along said bed, latch mechanism between said rock shaft and said clutches insuring closing of either clutch which may be open when said shaft is rocked in one direction, means controlled by each drum for so rocking said shaft before its own clutch may be opened to thereby insure the rotation of the other drum before either drum may stop by opening of its clutch, and means for returning said rock shaft after each rocking actuation to its initial angular position.

19. A machine of the class described having a work holder, tool carrying members comprising an indexing turret and a tool slide, members including a cam drum for controlling said turret and a cam drum for controlling said slide, means for rotating said turret control cam drum once for each indexed position of said turret, means for rotating said slide control cam drum once for the entire cycle of operations of the machine, cam mechanism rotated with said slide control drum for controlling the speed of rotation of said slide control drum, cam mechanism rotated with said turret control drum but at a slower rate to complete a single rotation in a complete machine cycle for controlling the speed of rotation of said turret control drum, means controlled by each of said cam mechanisms for stopping its respective cam drum, and means controlled by each of said cam mechanisms for ensuring the rotation of the other cam drum before the rotation of its respective drum is stopped.

20. A machine of the class described having a work holder, tool carrying members including an indexing turret and another member, means controlling the motions of said members including a cam drum for controlling said turret and a cam drum for controlling said other tool carrying member, means for rotating said turret control cam drum once for each indexed position of said turret, means for rotating the other cam drum once for the entire cycle of operations of the machine, means controlled by each drum for controlling its own speed of rotation and for stopping its rotation, and means controlled by each drum ensuring the rotation of the other drum when it effects its own stopping.

21. A machine of the class described having a pair of movable members, rotary cam mechanism for controlling each of said members, driving means for each mechanism, means controlled by each cam mechanism for stopping its rotation, a starting member, means actuated by movement of said starting member for ensuring the operative connections of both said mechanisms with their driving means, and means actuated by each of said mechanisms in advance of its stopping for actuating said starting member.

22. A machine of the class described having a pair of movable members, rotary cam mechanisms for moving each of said members, driving means for said mechanisms, a clutch between each of said mechanisms and its driving means, a rock shaft, connections from said rock shaft ensuring closing of said clutches on rocking of said shaft from one angular position, means controlled by each mechanism for opening its respective clutch, and means controlled by each mechanism for rocking said shaft to ensure the motion of the other mechanisms in advance of the actuation of its clutch opening means.

23. A machine of the class described having a pair of movable members, rotary cam mechanisms for moving each of said members, driving means for said mechanisms, a clutch between each of said mechanisms and its driving means, a rock shaft, connections from said rock shaft ensuring closing of said clutches on rocking of said shaft from one angular position, a latch tending to hold each of said clutches open when opening has been effected, and means actuable by said rock shaft when rocked to first release said latch and then to close said clutch.

JOHN E. LOVELY.
JOHN R. KNIGHTS.